United States Patent
Harper et al.

(10) Patent No.: US 9,776,265 B2
(45) Date of Patent: Oct. 3, 2017

(54) SYSTEM, METHOD AND RETRACTABLE AND/OR FOLDING APPARATUS FOR CUTTING AN OBJECT

(71) Applicant: Mactech, Inc., Red Wing, MN (US)

(72) Inventors: Michael James Harper, Red Wing, MN (US); Joel Kent Wittenbraker, Red Wing, MN (US)

(73) Assignee: MACTECH, INC., Red Wing, MN (US)

( * ) Notice: Subject to any disclaimer, the term of this patent is extended or adjusted under 35 U.S.C. 154(b) by 600 days.

(21) Appl. No.: 13/908,088

(22) Filed: Jun. 3, 2013

(65) Prior Publication Data

US 2014/0352506 A1  Dec. 4, 2014

(51) Int. Cl.
  B26D 3/16 (2006.01)
  B26D 7/02 (2006.01)
  B23D 57/00 (2006.01)

(52) U.S. Cl.
  CPC ..... B23D 57/0038 (2013.01); B23D 57/0084 (2013.01); B23D 57/0092 (2013.01); Y10T 83/0405 (2015.04); Y10T 83/8775 (2015.04); Y10T 83/9292 (2015.04)

(58) Field of Classification Search
  CPC ............... B26D 1/547; B23D 57/0007; B23D 57/0053; B23D 57/0038; B23D 57/0084; B23D 57/0092; Y10T 83/8775; Y10T 83/0405
  USPC .... 83/456, 648, 745, 657, 651.1; 30/116, 92
  See application file for complete search history.

(56) References Cited

U.S. PATENT DOCUMENTS

| | | |
|---|---|---|
| 482,103 A | 9/1892 | Speer |
| 1,420,950 A | 6/1922 | Elder |
| 3,835,901 A | 9/1974 | Jonsson |
| 4,705,331 A * | 11/1987 | Britton .................... B63C 11/40 24/463 |
| 5,329,562 A | 7/1994 | Kubo et al. |
| 5,361,748 A | 11/1994 | Matteucci |
| 5,524,517 A | 6/1996 | Robinson |
| 5,597,041 A | 1/1997 | Robinson |
| 6,065,462 A | 5/2000 | Hodsden et al. |
| 6,267,037 B1 | 7/2001 | McCoy, Jr. et al. |
| 6,279,564 B1 | 8/2001 | Hodsden et al. |
| 6,881,131 B2 | 4/2005 | Parsells et al. |
| 7,036,599 B2 | 5/2006 | Matteucci |
| 7,406,905 B2 | 8/2008 | Lawler et al. |
| 7,922,424 B2 | 4/2011 | Clark |
| 8,056,633 B2 | 11/2011 | Barra et al. |
| 8,833,219 B2 | 9/2014 | Pierce |

(Continued)

FOREIGN PATENT DOCUMENTS

| IT | WO 2013114411 A1 * | 8/2013 | ......... B23D 57/0084 |
|---|---|---|---|
| WO | PCTUS1447944 | 4/2015 | |

*Primary Examiner* — Omar Flores Sanchez
(74) *Attorney, Agent, or Firm* — Lempia Summerfield Katz LLC

(57) ABSTRACT

A system, a method and a collapsible and/or folding apparatus may use a wire loop to cut an object. The apparatus may have a wire loop connected to pulleys on a carriage attached to a frame. The carriage may move relative to the frame to direct the wire loop through the object. The apparatus may have arms on the carriage that may be folded and/or a kicker frame pivotably connected to the frame that may be retracted to reduce the overall size of the apparatus.

13 Claims, 14 Drawing Sheets

(56) References Cited

U.S. PATENT DOCUMENTS

| | | | |
|---|---|---|---|
| 2006/0278057 A1* | 12/2006 | Wuertemberger | B23D 57/0007 83/651.1 |
| 2007/0267006 A1 | 11/2007 | Ogyu | |
| 2008/0022830 A1 | 1/2008 | Lawler et al. | |
| 2008/0304915 A1 | 12/2008 | Bang | |
| 2009/0314149 A1* | 12/2009 | Clark, II | B23D 57/0007 83/651.1 |
| 2011/0214543 A1 | 9/2011 | Shae et al. | |
| 2012/0117959 A1 | 5/2012 | Lewkoski | |
| 2014/0157964 A1* | 6/2014 | Davis | B23D 57/0007 83/56 |

* cited by examiner

SYSTEM, METHOD AND RETRACTABLE AND/OR FOLDING APPARATUS FOR CUTTING AN OBJECT

BACKGROUND OF THE INVENTION

The present invention generally relates to a retractable and/or folding apparatus, system and method for using a wire to cut an object. More specifically, the present invention relates to a retractable and/or folding apparatus that may use a wire loop to cut an object.

Offshore platforms have a base structure formed by pipelines. If the offshore platforms are decommissioned and/or dismantled, the pipelines must be removed. The pipelines may extend into the sea floor. Therefore, pipelines are typically removed from the sea floor by cutting the pipelines at a location on the pipeline adjacent to the sea floor. Known systems exist for cutting the pipelines. For example, known systems for cutting the pipelines may use diamond-impregnated beads affixed to a continuous strand of rubber-encapsulated steel wire that is looped onto a drive pulley and driven at a high speed.

The known systems require clearance on multiple sides of the pipeline. The clearance required by the known systems may hinder the systems from cutting the pipeline. For example, the clearance required by the known systems may increase a distance between the cut and the sea floor. Thus, after cutting by the known systems, a portion of the pipeline may continue to extend from the sea floor. Moreover, the clearance required by the known systems may prevent the systems from cutting the pipeline if the pipeline is adjacent to obstructions. Thus, known systems may not cut the pipeline if the pipeline is adjacent to obstructions.

Further, a diamond wire saw may be used for subsea and topside cutting of a variety of materials and projects. A diamond wire saw may be ideal for cutting multi-string applications or heavy wall legs and cross members. Typical uses for a diamond wire saw include offshore decommissioning and subsea or topside maintenance of oil drilling platforms and the like.

Moreover, saws and other cutting devices capable of cutting large pipelines and/or structures may necessarily be correspondingly large machines to accommodate the large pipelines. However, the size of the saw may preclude its use in certain environments and/or locations. Typically, space may be limited on offshore oilrigs, for example. Thus, adequate room for use and/or storage of such large equipment may not be available. A need exists for saws capable of cutting large pipelines and/or structures that may be used and/or accommodated in a limited space environment.

SUMMARY OF THE INVENTION

The present invention generally relates to a system, a method and a retractable and/or folding apparatus for cutting an object. More specifically, the present invention relates to an apparatus that may use a diamond impregnated wire loop to cut an underwater pipeline. The apparatus may have a frame, a carriage attached to the frame and/or pulleys connected to the carriage. The wire may be connected to the pulleys. The carriage may move relative to the frame to direct the wire loop in a forward direction relative to the frame and/or through the pipeline. The apparatus may be folded and/or retracted to reduce the overall size of the apparatus for more convenient transportation and/or storage.

The design of the diamond wire saw may reduce setup time and/or effort, installation and/or removal time. These advantages may save a user time and/or money for cutting applications. Certain diamond wire saws may be easily customized and adaptable to specific project needs.

An example of such a cutting apparatus is disclosed by Shae et al. in U.S. Patent Application Publication No. 2011/0214543 A1, assigned to the assignee of the present application, and incorporated herein by reference in its entirety. The saw may be used for cutting multi-string casings, structures and/or any large and/or heavy material. The saw may also cut in any orientation which broadens the use and applicability of the saw for various applications. The saw may have a drive to enable the saw to cut through steel and/or aggregates in a filled casing and/or pipe. The powerful drive also may enable the saw to cut with fewer hang-ups during the cutting process. The saw may also have a rigid frame to improve accuracy and/or repeatability and/or to make back-cutting easier. Further, the saw may resist breaking due to the continuous loop diamond wire that may be used in the saw. Also, the saw may make multiple cuts with a single wire. The saw may cut faster, and the wire may last longer than cutting wires that are made from electroplated and/or sintered wire.

Also, the saw may be used underwater and/or for topside cutting. The saw may be used underwater but may be operated in both environments, underwater and/or topside. However, when operating the saw out of water, cooling for the cutting and/or the wire may be required. The cooling may typically be accomplished with water sprayed onto the wire and/or the cutting surface. Further, the cutting apparatus may be suspended in air by lifting devices and/or cranes during a cutting operation out of the water.

To this end, in an embodiment of the present invention, an apparatus for cutting an object is provided. An apparatus for cutting an object is provided. The apparatus may have a carriage and a frame having a first end and a second end located opposite to the first end. The carriage may move on the frame from a first position at the first end of the frame to a second position at the second end of the frame. The apparatus may have a first arm and a second arm each pivotably connected to the carriage. The apparatus may also have a first pulley connected to the first arm, and a second pulley connected to the second arm. The apparatus may further have a wire attached to the first pulley and the second pulley. The wire may travel through the first pulley and the second pulley.

In an embodiment, the apparatus may have a kicker frame pivotably connected at the first end of the frame wherein the kicker frame has a folding leg having a first end connected to the kicker frame and a second end connected to the frame wherein the kicker frame pivots away from the second end of the frame when the folding leg is extended.

In an embodiment, the apparatus may have a kicker frame having a first end and a second end opposite the first end wherein the first end of the kicker frame is pivotably connected at the first end of the frame wherein the kicker frame has a crossbar at the second end of the kicker frame and further wherein the kicker frame has an alignment plate connected to the crossbar.

In an embodiment, the apparatus may have an end portion connected at the second end of the frame wherein the end portion has an alignment plate.

In an embodiment, the apparatus may have a drive pulley connected to the carriage wherein the wire travels through the drive pulley, the first pulley and the second pulley.

In an embodiment, the apparatus may have a hydraulic circuit connected to the carriage.

In an embodiment, the first pulley is adjustable.

In an embodiment, the apparatus may have a hinge connecting each of the first arm and the second arm to the carriage.

In an embodiment, the apparatus may have a safety guard connected along an outer edge of each of the carriage, the first arm and the second arm.

In an embodiment, the apparatus may have rings connected to each of the first arm and the second arm.

In an embodiment, the apparatus may have a first hollow bar and a second hollow bar of the frame. Each of the first hollow bar and the second hollow bar may have an opening therethrough. The first bar and the second bar may be substantially parallel to each other.

In an embodiment, the apparatus may have a support plate connected to an end of the frame.

In an embodiment, the apparatus has a drive train having a gear on the carriage and a rack on the frame. The gear may engage the rack to move the carriage from the first position to the second position.

In another embodiment of the present invention, a method for folding a cutting apparatus for cutting an object using a wire connected to pulleys on a carriage connected to a frame is provided. The carriage may have a first arm and a second arm. The method has the steps of removing the wire by adjusting one of the pulleys, unlocking the first arm and the second arm, attaching a support plate to the frame, folding the first arm and the second arm so that each of the first arm and the second arm contacts the support plate, and securing the first arm and the second arm to the support plate.

In an embodiment, the method has the steps of attaching a second support plate to the carriage, and securing the first arm and the second arm to the second support plate.

In an embodiment, the method has the step of pivoting a kicker frame connected to the frame in a first direction relative to the frame. The frame and the kicker frame may align the object relative to the carriage for cutting the object. The method also may pivot the kicker frame in a second direction after cutting the object.

In an embodiment, the method has the step of rotating a driveshaft connected to the carriage. Rotating the driveshaft in a first direction may move the carriage from the first position to the second position, and rotating the driveshaft in a second direction opposite to the first direction may move the carriage from the second position to the first position relative to the frame.

In another embodiment of the present invention, a system for cutting an object is provided. The system may have a carriage connected to a frame. The carriage may move from a first position relative to the frame to a second position relative to the frame to cut the object. The system may have a drive train connected to the frame and the carriage. Pulleys may be connected to the carriage, and a motor may be connected to one of the pulleys. A wire may be attached to the pulleys. The wire may travel through the pulleys. The system may also have a first hydraulic circuit to operate the motor for rotating the wire, and a second hydraulic circuit to operate the drive train for translating the carriage relative to the frame.

In an embodiment, a first arm and a second arm may each be pivotably connected to the carriage.

In an embodiment, a kicker frame may be connected to the frame. The kicker frame may pivot relative to the frame.

It is, therefore, an advantage of the present invention to provide a system, a method and a retractable and/or folding apparatus for cutting an object.

Another advantage of the present invention is to provide a system, a method and a retractable and/or folding apparatus for cutting an object which may use a diamond-impregnated wire to cut an underwater pipeline.

A further advantage of the present invention is to provide a system, a method and a retractable and/or folding apparatus for cutting an object which may rotate the diamond-impregnated wire relative to the plane of the cut.

Yet another advantage of the present invention is to provide a system, a method and a retractable and/or folding apparatus for cutting an object which may reduce wear on the diamond-impregnated wire relative to known cutting apparatuses.

Another advantage of the present invention is to provide a system, a method and a retractable and/or folding apparatus for cutting an object which may reduce time required to cut an object relative to known cutting apparatuses.

A further advantage of the present invention is to provide a system, a method and a retractable and/or folding apparatus for cutting an object which may reduce space required to install and/or operate the apparatus relative to known cutting apparatuses.

Yet another advantage of the present invention is to provide a system, a method and a retractable and/or folding apparatus for cutting an object which may reduce space required to transport and/or store the apparatus relative to known cutting apparatuses.

Another advantage of the present invention is to provide a system, a method and a retractable and/or folding apparatus for cutting an object which may be controlled using a remotely operated vehicle ("ROV") interface.

A further advantage of the present invention is to provide a system, a method and a retractable and/or folding apparatus for cutting an object which may operate using hydraulic power.

Yet another advantage of the present invention is to provide a system, a method and a retractable and/or folding apparatus for cutting an object which may cut a pipeline having a large diameter, i.e., as large as 102 inches, for example.

Another advantage of the present invention is to provide a system, a method and a retractable and/or folding apparatus for cutting an object which may enable replacement of the diamond-impregnated wire without removing the apparatus from a pipeline.

A further advantage of the present invention is to provide a system, a method and a retractable and/or folding apparatus for cutting an object which may cut adjacent to a seabed without excavation of the seabed.

Yet another advantage of the present invention is to provide a system, a method and a retractable and/or folding apparatus for cutting an object which may reduce a volume of excavation for sub-seabed cuts relative to known cutting devices.

Another advantage of the present invention is to provide a system, a method and a retractable and/or folding apparatus for cutting an object which may have a self-compensating feed circuit which may automatically adjust the feed rate to an efficient cutting speed.

Yet another advantage of the present invention is to provide a system, a method and a retractable and/or folding apparatus for cutting an object which may be installed in any orientation.

Another advantage of the present invention is to provide a system, a method and a retractable and/or folding apparatus for cutting an object which may use an electroplated wire.

A further advantage of the present invention is to provide a system, a method and a retractable and/or folding apparatus for cutting an object which may reduce labor and/or time required to install and/or remove the apparatus relative to known cutting apparatuses.

Yet another advantage of the present invention is to provide a system, a method and a retractable and/or folding apparatus for cutting an object which may cut multiple-string underwater pipelines which may contain aggregate fill material.

Another advantage of the present invention is to provide a system, a method and a retractable and/or folding apparatus for cutting an object which may achieve linear wire travel.

A further advantage of the present invention is to provide a system, a method and a retractable and/or folding apparatus for cutting an object which may have a pressure compensation valve.

Moreover, an advantage of the present invention is to provide a system, a method and a retractable and/or folding apparatus for cutting an object which may reduce the weight of the apparatus relative to known cutting apparatuses.

Another advantage of the present invention is to provide a system, a method and a retractable and/or folding apparatus for cutting an object which may also have a rigid frame to improve accuracy and/or repeatability and/or to simplify back-cutting.

A further advantage of the present invention is to provide a system, a method and a retractable and/or folding apparatus for cutting an object which may have a continuous loop diamond wire that may be used to make multiple cuts with a single wire.

Yet another advantage of the present invention is to provide a system, a method and a retractable and/or folding apparatus for cutting an object which may cut faster and the wire may last longer than cutting wires that are made from electroplated and/or sintered wire.

Moreover, an advantage of the present invention is to provide a system, a method and a retractable and/or folding apparatus for cutting an object which may be foldable to reduce the size of the apparatus for transporting and/or shipping.

Another advantage of the present invention is to provide a system, a method and a retractable and/or folding apparatus for cutting an object which may be foldable to reduce the size of the apparatus when not in use and/or for storage.

A further advantage of the present invention is to provide a system, a method and a retractable and/or folding apparatus for cutting an object which may have a hydraulic circuit to operate a drive motor for wire rotation and a second hydraulic circuit to operate a feed motor for translating the wire frame into the pipe or structure to be cut.

Yet another advantage of the present invention is to provide a system, a method and a retractable and/or folding apparatus for cutting an object which may use a hydraulic motor to drive a spur gear against a rack for the translation motion of a carriage. The carriage may ride on a series of double v-rollers on a pair of v-rails fixed to the lower frame.

A further advantage of the present invention is to provide a system, a method and a retractable and/or folding apparatus for cutting an object which may have a collapsible lower kicker frame that may collapse for minimizing space for transport and/or storage.

Yet another advantage of the present invention is to provide a system, a method and a retractable and/or folding apparatus for cutting an object which may use cylinders and/or linear actuators for raising and lowering the arms and/or the kicker frame.

Additional features and advantages of the present invention are described in, and will be apparent from, the detailed description of the presently preferred embodiments and from the drawings.

DETAILED DESCRIPTION OF THE PREFERRED EMBODIMENTS

Figure 1:
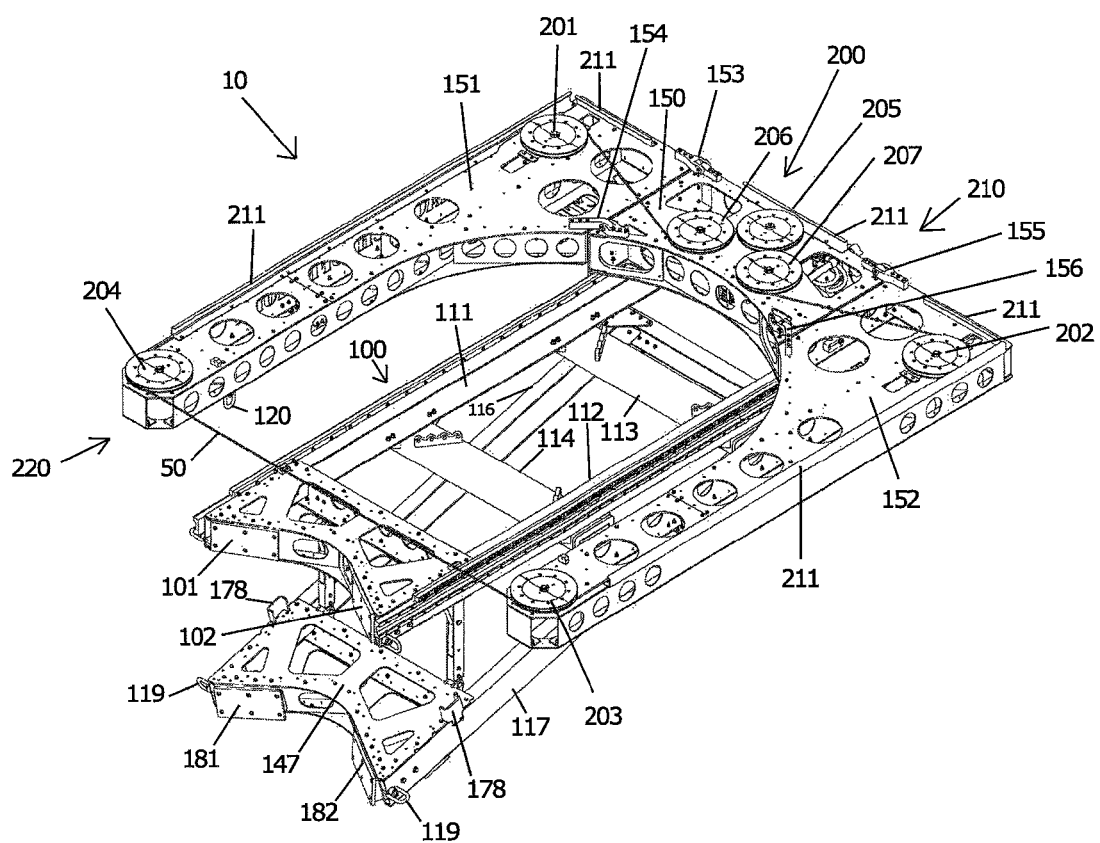
FIG. 1 illustrates a perspective front view of a cutting apparatus in an extended position in an embodiment of the present invention.
Figure 2:
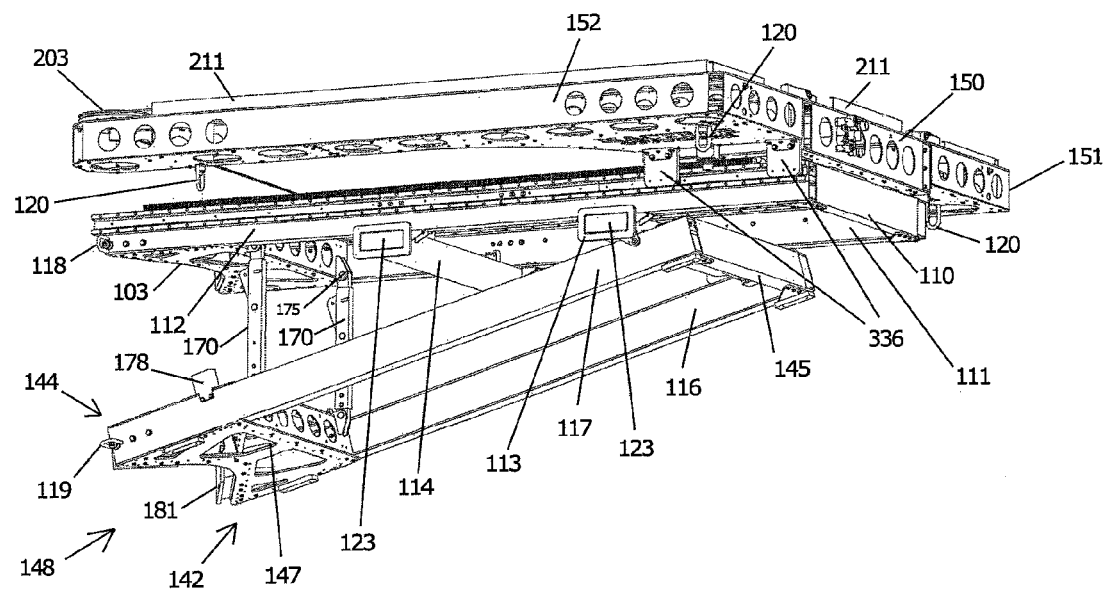
FIG. 2 illustrates a perspective rear view of a cutting apparatus in an extended position in an embodiment of the present invention.

The present invention generally relates to an apparatus, a system and a method for using a diamond-impregnated wire to cut an object. More specifically, the present invention relates to an apparatus that may use a diamond-impregnated wire loop to cut an underwater pipeline. The apparatus may use the diamond-impregnated wire loop to cut single-string and/or multiple-string underwater pipelines which may contain aggregate fill material. The apparatus may have a frame, a carriage attached to the frame and/or pulleys connected to the carriage. The diamond-impregnated wire loop may be connected to the pulleys. The carriage may move relative to the frame to direct the diamond-impregnated wire loop in a forward direction relative to the frame and/or through the pipeline. Hydraulic power may move the carriage relative to the frame. The frame of the apparatus may be positioned substantially parallel to the longitudinal direction of the pipeline during cutting. The apparatus may be folded and/or retracted to reduce the overall size of the apparatus for more convenient transportation and/or storage.

Referring now to the drawings wherein like numerals refer to like parts, FIGS. 1-10, 11A, 11B, 12A, 12B, 13A, 13B, 14A, 145, 15 and 16 generally illustrate a cutting apparatus 10 in embodiments of the present invention. The cutting apparatus 10 may have a frame 100 and a carriage 200 which may be connected to the frame 100. The carriage 200 may move relative to the frame 100 as described in more detail hereafter.

The carriage 200 may have a center portion 150. The carriage 200 may also have a first arm 151 and a second arm 152. The first arm 151 and the second are 152 may each be movably connected to the center portion 150. For example, the first arm 151 may be pivotally connected to the center portion 150 by a first hinge 153 and/or a second hinge 154. The second arm 152 may be pivotally connected to the center portion 150 by a third hinge 155 and/or a fourth hinge 156. The first arm 151 may be rotated toward the center portion 150 of the carriage 200 by using the first hinge 153 and/or the second hinge 154 as a pivot, and the second arm 152 may be rotated toward the center portion 150 of the carriage 200 by using the third hinge 155 and/or the fourth hinge 156 as a pivot as described in more detail hereafter.

The carriage 200 may have a first end 210 and a second end 220 located in a position opposite to the first end 210. The carriage 200 may also have at least two pulleys. For example, the carriage 200 may have a first pulley 201, a second pulley 202, a third pulley 203 and a fourth pulley 204. The first pulley 201 and the second pulley 202 may be located adjacent to the first end 210 of the carriage 200. The first pulley 201 and/or the second pulley 202 may be adjustable tension pulleys as described in more detail hereafter. The third pulley 203 and the fourth pulley 204 may be located adjacent to the second end 220 of the carriage 200. Further, the third pulley 203 and the fourth pulley 204 may be fixed pulleys. Thus, the first pulley 201 and the fourth pulley 204 may be located on the first arm 151, and the second pulley 202 and the third pulley 203 may be located on the second arm 152. The carriage 200 may also have additional pulleys. For example, a fifth pulley 205, a sixth pulley 206 and a seventh pulley 207 may be located on the center portion 150 of the carriage 200. The fifth pulley 205 may be a drive pulley or a motorized driven pulley. The sixth pulley 206 and the seventh pulley 207 may be fixed idler pulleys. The operation of the pulleys is described in more detail hereafter.

A wire 50 may be connected to the carriage 200. For example, the wire 50 may be connected to the first pulley 201, the second pulley 202, the third pulley 203, the fourth pulley 204, the fifth pulley 205, the sixth pulley 206 and/or the seventh pulley 207. For example, in an embodiment, the wire 50 may be a loop having a fixed length that travels through each of the first pulley 201, the second pulley 202, the third pulley 203, the fourth pulley 204, the fifth pulley 205, the sixth pulley 206 and/or the seventh pulley 207. Diamond beads may be adhered to, impregnated into and/or affixed on the wire 50. The wire 50 may have a surface area, and the diamond beads may be distributed substantially continuously and/or evenly over the surface area of the wire 50. In an embodiment, the diamond beads may be sintered to the wire 50. In another embodiment, the diamond beads may be electroplated on the wire 50 by using electric current to coat the wire 50 with at least a single layer of the diamond beads. In an embodiment, the wire 50 may be a steel wire. The present invention is not limited to a specific embodiment of the wire 50.

Figure 14A:
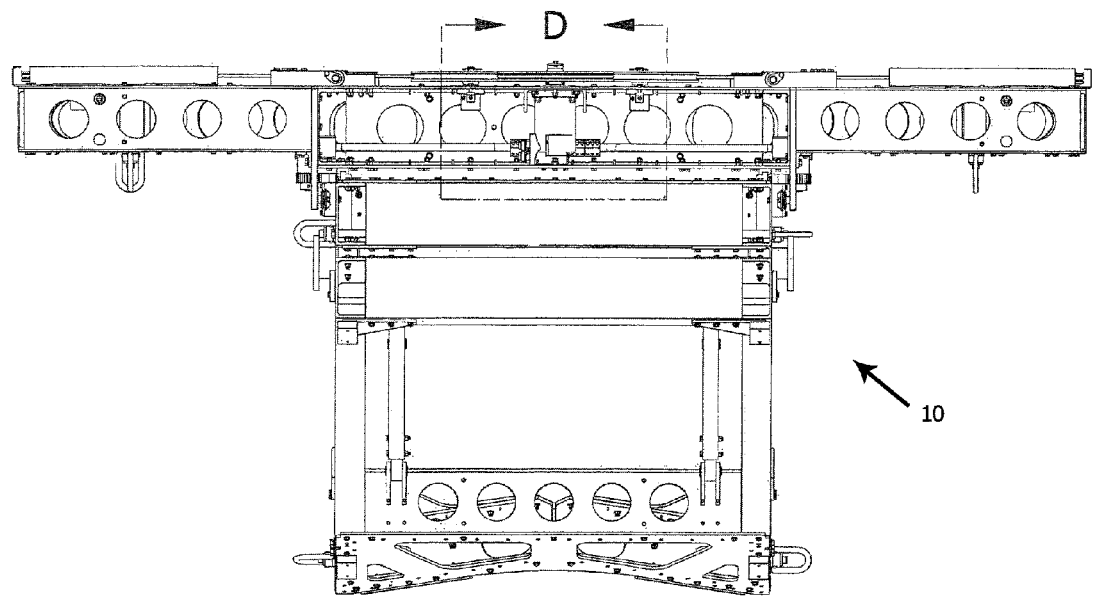
FIG. 14A illustrates a rear view of a cutting apparatus in an extended position in an embodiment of the present invention.
Figure 14B:
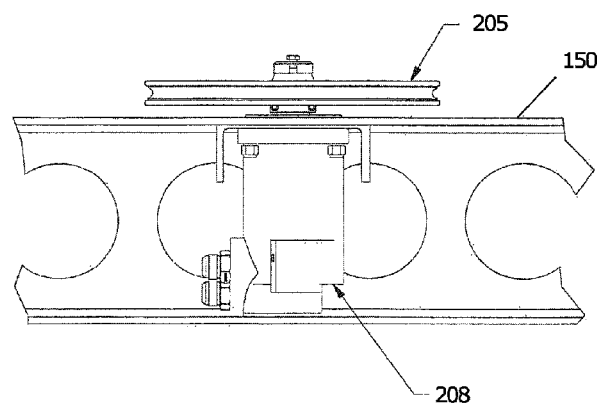
FIG. 14B illustrates a detail view delineated by region "D" of FIG. 14 of a cutting apparatus in an embodiment of the present invention.

One or more of the first pulley 201, the second pulley 202, the third pulley 203, the fourth pulley 204, the fifth pulley 205, the sixth pulley 206 and/or the seventh pulley 207 may be referred to as a motorized pulley, a drive pulley and/or a motorized drive pulley. In particular, FIGS. 14A and 14B illustrate the fifth pulley 205 as the motorized pulley. The motorized pulley 205 may be connected to a pulley motor 208 which may provide power to the motorized pulley 205. The pulley motor 208 may be directly attached to the motorized drive pulley 205. As shown in FIG. 14B, the pulley motor 208 may be located below the motorized drive pulley 205. The pulley motor 208 may adjust the speed of the motorized pulley 205 to control the feed rate at which the wire 50 may travel through each of the each of the first pulley 201, the second pulley 202, the third pulley 203, the fourth pulley 204, the fifth pulley 205, the sixth pulley 206 and/or the seventh pulley 207.

Figure 15:
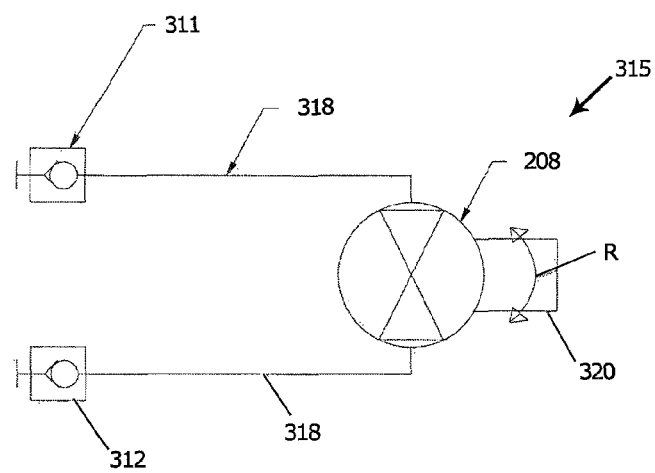
FIG. 15 illustrates a schematic diagram of a first hydraulic circuit for driving a motorized pulley of a cutting apparatus in an embodiment of the present invention.

In an embodiment, the pulley motor 208 may be a hydraulic motor. FIG. 15 is a schematic diagram that illustrates a first hydraulic circuit 315 for the pulley motor 208 to drive the motorized drive pulley 205. The pulley motor 208 may be any motor known to one having ordinary skill in the art, such as a hydraulic motor, for example. The motorized pulley 205 may rotate to direct the wire 50 through the first pulley 201, the second pulley 202, the third pulley 203, the fourth pulley 204, the fifth pulley 205, the sixth pulley 206 and/or the seventh pulley 207. The pulley motor 208 may control a rotation rate of the motorized pulley 205. The pulley motor 208 may control a wire speed at which the wire 50 travels through the first pulley 201, the second pulley 202, the third pulley 203, the fourth pulley 204, the fifth pulley 205, the sixth pulley 206 and/or the seventh pulley 207 by adjusting the rotation rate of the motorized pulley. The present invention is not limited to a specific embodiment of the motorized pulley or the number of pulleys which are motorized pulleys, and the motorized pulley may be any pulley which directs the wire 50 through the first pulley 201, the second pulley 202, the third pulley 203, the fourth pulley 204, the fifth pulley 205, the sixth pulley 206 and/or the seventh pulley 207.

Figure 3:
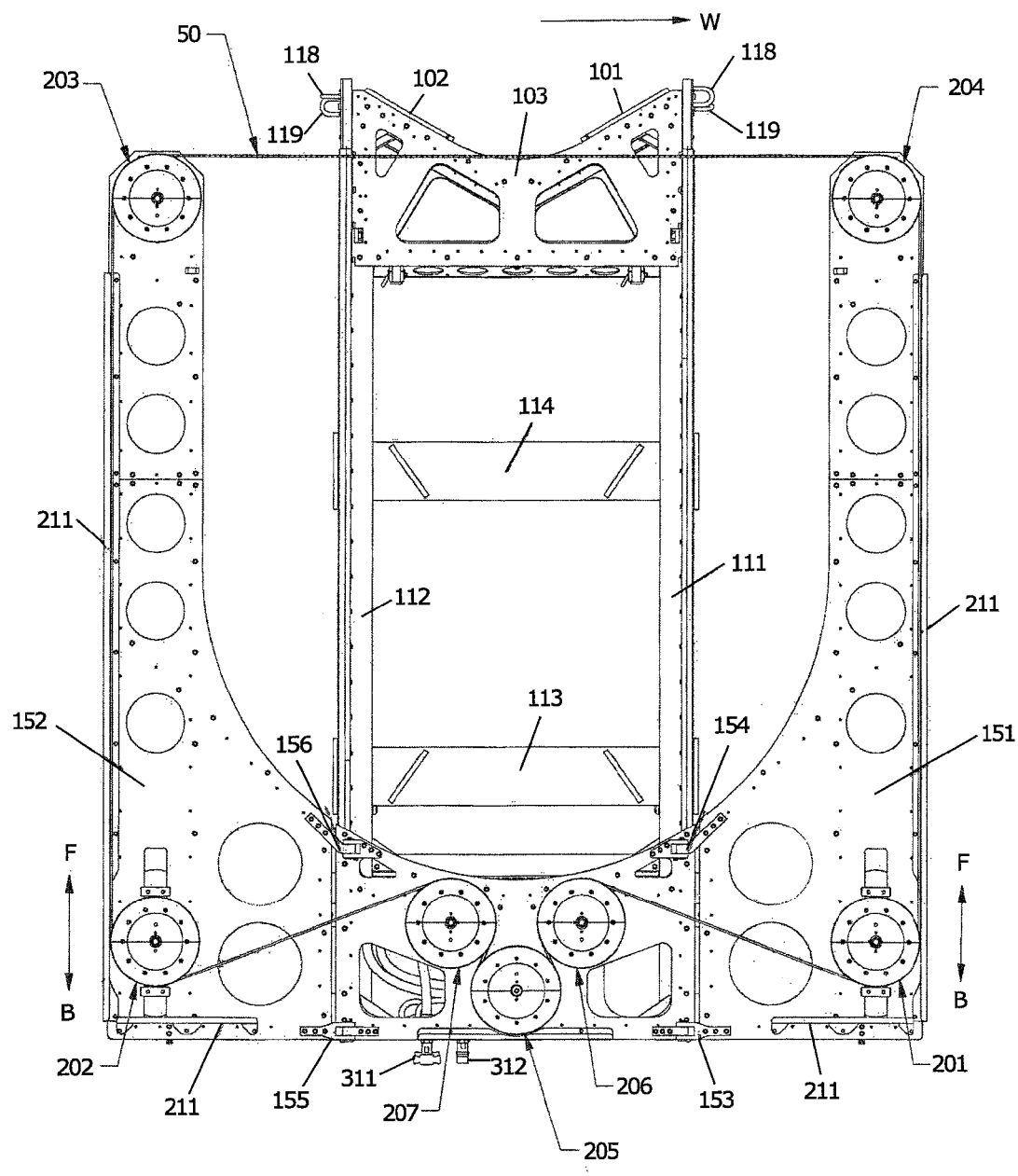
FIG. 3 illustrates a top view of a cutting apparatus in an extended position in an embodiment of the present invention.
Figure 4:
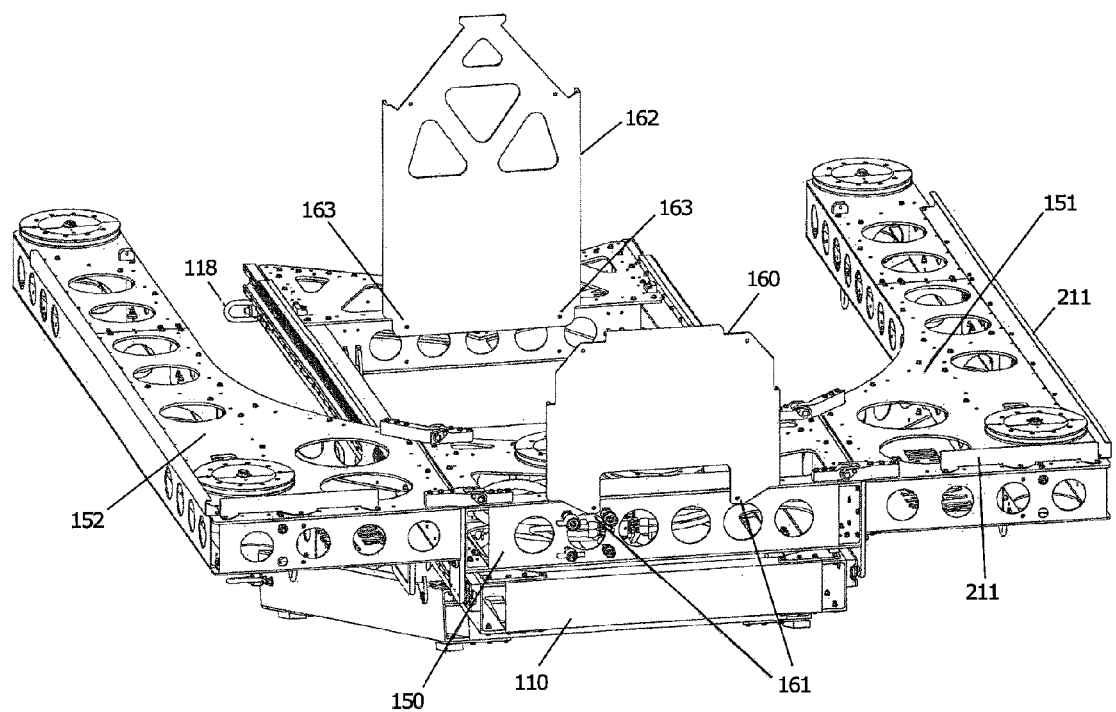
FIG. 4 illustrates a perspective rear view of a cutting apparatus in an extended position in an embodiment of the present invention.
Figure 5:
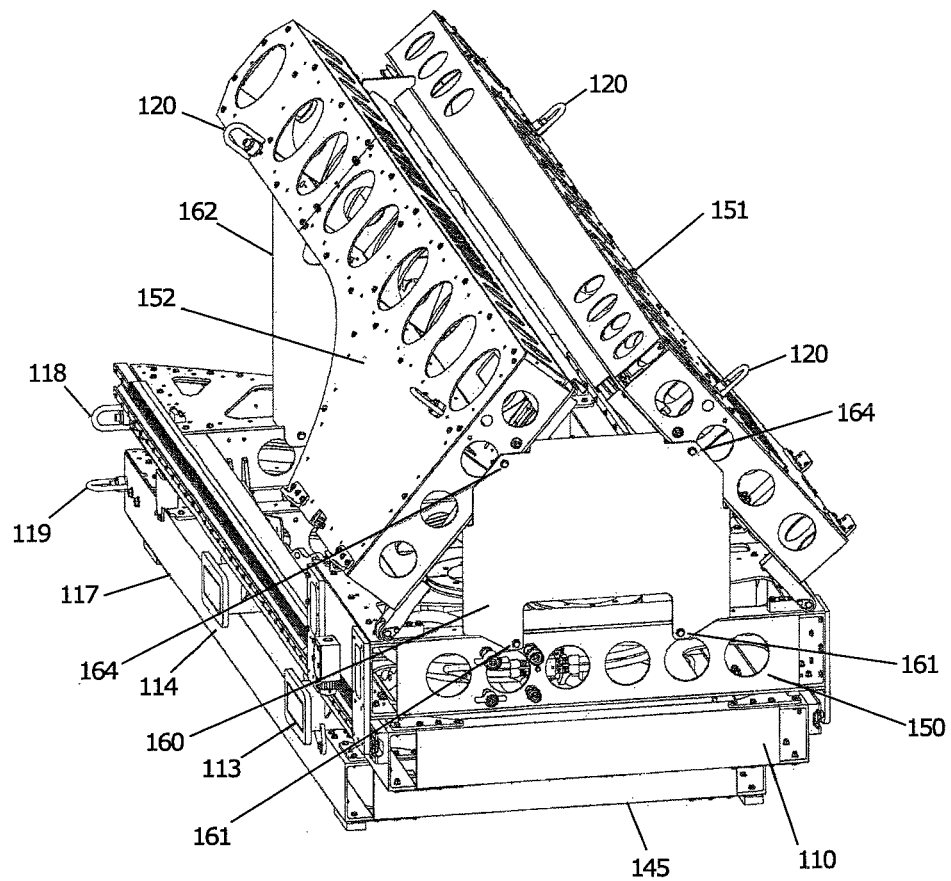
FIG. 5 illustrates a perspective rear view of a cutting apparatus in a folded and retracted position in an embodiment of the present invention.
Figure 9:
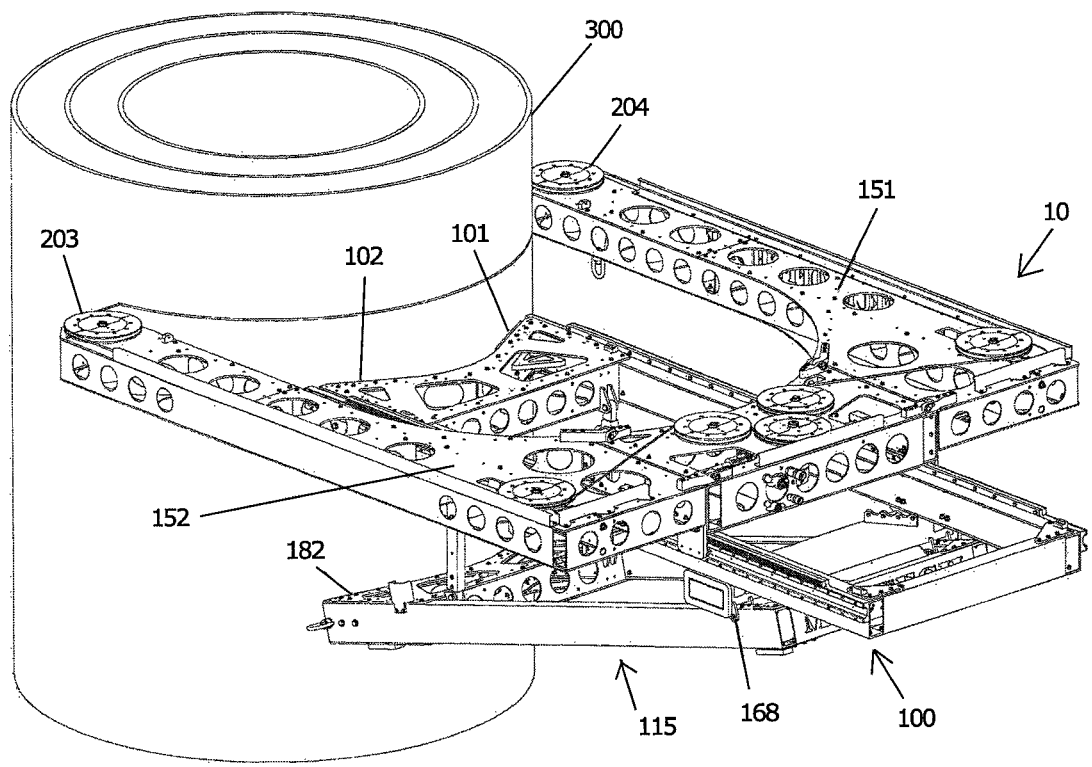
FIG. 9 illustrates a perspective view of a cutting apparatus in an extended position with a pipeline in an embodiment of the present invention.
Figure 10:
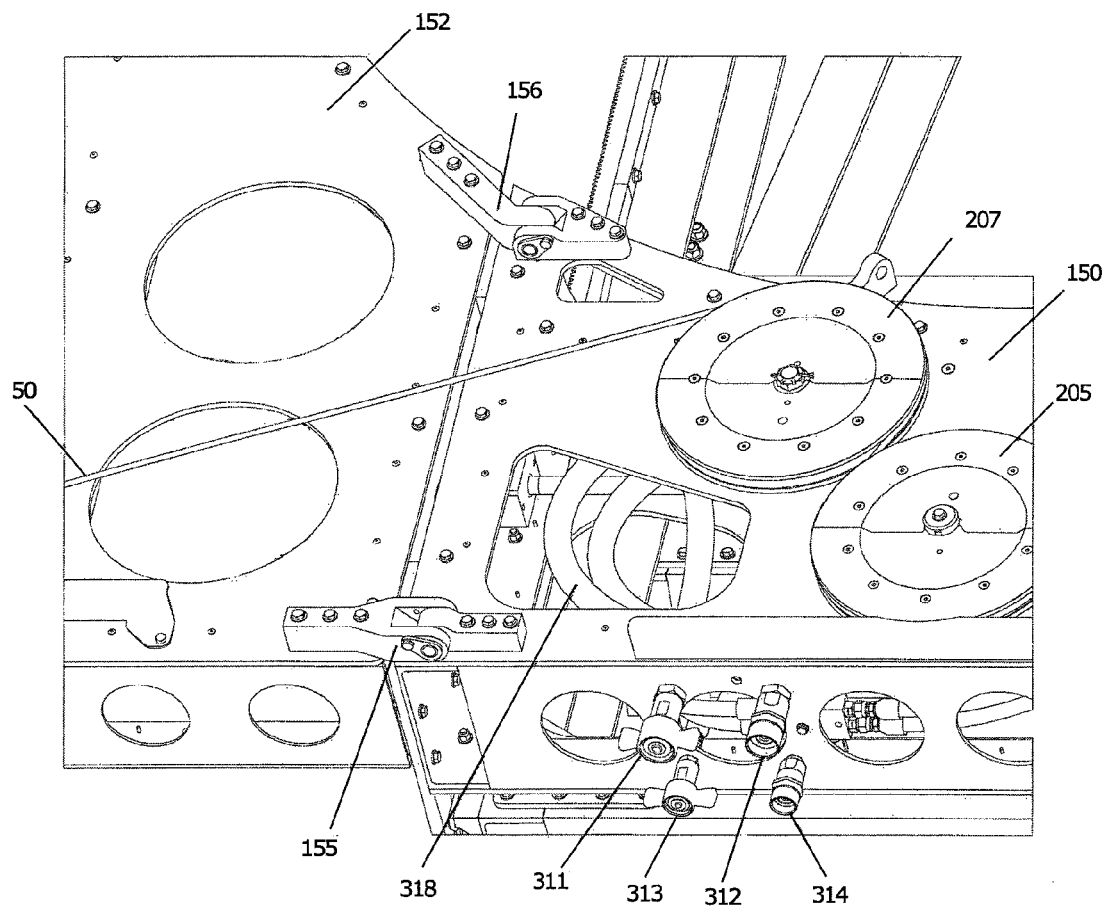
FIG. 10 illustrates a detail view of a cutting apparatus in an embodiment of the present invention.

As shown in FIGS. 1, 3, 9, 10 and 11A, three pulleys may be located near each other at the first end 210 of the carriage 200. The three pulleys may be connected to the center portion 150 of the carriage 200. The center pulley of the three pulleys, namely the fifth pulley 205, may be the motorized drive pulley. The other two pulleys, namely the sixth pulley 206 and the seventh pulley 207, may be used as fixed idler pulleys to provide additional wrap on the fifth pulley 205. The additional wrap may provide that the wire 50 may be in contact with a greater portion of the circumference of the fifth pulley 205. The additional wrap enables better traction on the fifth pulley 205. The wrap on the fifth pulley 205, may be approximately 75% of the circumference of the fifth pulley 205, as shown in FIGS. 3 and 10.

A safety guard 211 may be connected along an outer edge of each of the center portion 150 of the carriage 200, as well as the first arm 151 and the second arm 152, respectively. The safety guard 211 may be located on the first arm 151 and the second arm 152 to restrict the wire 50 from flying off the carriage 200 in case of a break of the wire 50. The safety guard 211 may also prevent a user from accidently coming into contact with the wire 50 during operation and/or at any other time.

In an embodiment, the frame 100 may have a first rail 111 and a second rail 112 which may be substantially parallel to each other. The first rail 111 may have a first end 121 and a second end 122 located in a position opposite to the first end 121. The second rail 112 may have a first end 131 and a second end 132 located in a position opposite to the first end 131. A distance from the first end 121 of the first rail 111 to the second end 122 of the first rail 111 may be approximately equal to a distance from the first end 131 of the second rail 112 to the second end 132 of the second rail 112.

The frame 100 may have an end bar 110 connected to the first end 121 of the first rail 111 and/or the first end 131 of the second rail 112. The frame 100 may also have a first bar 113 and/or a second bar 114. The end bar 110, the first bar 113 and/or the second bar 114 may connect the first rail 111 to the second rail 112. The first bar 113 may be connected nearer to the first end 121 of the first rail 111 and/or the first end 131 of the second rail 112. The second bar 114 may be connected nearer to the second end 122 of the first rail 111 and/or the second end 132 of the second rail 112. The first bar 113 and/or the second bar 114 may be substantially perpendicular to the first rail 111 and/or the second rail 112. The first bar 113 and/or the second bar 114 may be substantially parallel to each other. The first bar 113 and/or the second bar 114 may be hollow so that a fork truck may be used for handling the cutting apparatus 10. For example, the forks of a forklift and/or fork truck may be inserted into and fit within an opening 123 in the first bar 113 and/or the second bar 114. The first bar 113 and/or the second bar 114 may be separated by a distance and positioned under the first rail 111 and/or the second rail 112 so that the fork truck may properly and safely lift the cutting apparatus 10 using the first bar 113 and/or the second bar 114. In an embodiment, the cutting apparatus 10 may have additional components for rigging the cutting apparatus 10 with a crane or other lifting device described in more detail hereafter.

The frame 100 may have a kicker frame 115 that may be connected to the frame 100. The kicker frame 115 may have a first rail 116 and/or a second rail 117. The first rail 116 may have a first end 141 and a second end 142 located in a position opposite to the first end 141. The second rail 117 may have a first end 143 and a second end 144 located in a position opposite to the first end 143. A distance from the first end 141 of the first rail 116 to the second end 142 of the first rail 116 may be approximately equal to a distance from the first end 143 of the second rail 117 to the second end 144 of the second rail 117. The kicker frame 115 may have a crossbar 145 located at a first end 146 of the kicker frame 115 and/or a second end portion 147 located at a second end 148 of the kicker frame 115 opposite the first end 146 of the kicker frame 115. Both the crossbar 145 and the second end portion 147 may connect the first rail 116 of the kicker frame 115 to the second rail 117 of the kicker frame 115. The crossbar 145 and/or the second end portion 147 may be substantially perpendicular to the first rail 116 and/or the second rail 117. The crossbar 145 and/or the second end portion 147 may be substantially parallel to each other.

The cutting apparatus 10 may have lifting rings. The frame 100 may have first rings 118. For example, the first rings 118 may be connected at the second end 122 of the first rail 111 and/or the second end 132 of the second rail 112. The kicker frame 115 may have second rings 119. For example, the second rings 119 may be connected at the second end 142 of the first rail 116 and/or the second end 144 of the second rail 117. The first rings 118 and/or the second rings 119 may enable and/or aid transportation of the cutting apparatus 10. For example, a lifting and/or transporting device (not shown) may have hooks which may insert into the first rings 118 and/or the second rings 119 to lift and/or transport the cutting apparatus 10.

The first arm 151 and the second arm 152 may have third rings 120. The third rings 120 may enable transportation of the cutting apparatus 10. For example, a lifting and/or transporting device (not shown) may have hooks which may insert into the third rings 120 to lift and/or transport the cutting apparatus 10. Also, the third rings 120 may be used to assist a user in folding the first arm 151 and the second arm 152 as described in more detail hereafter.

Figure 6:
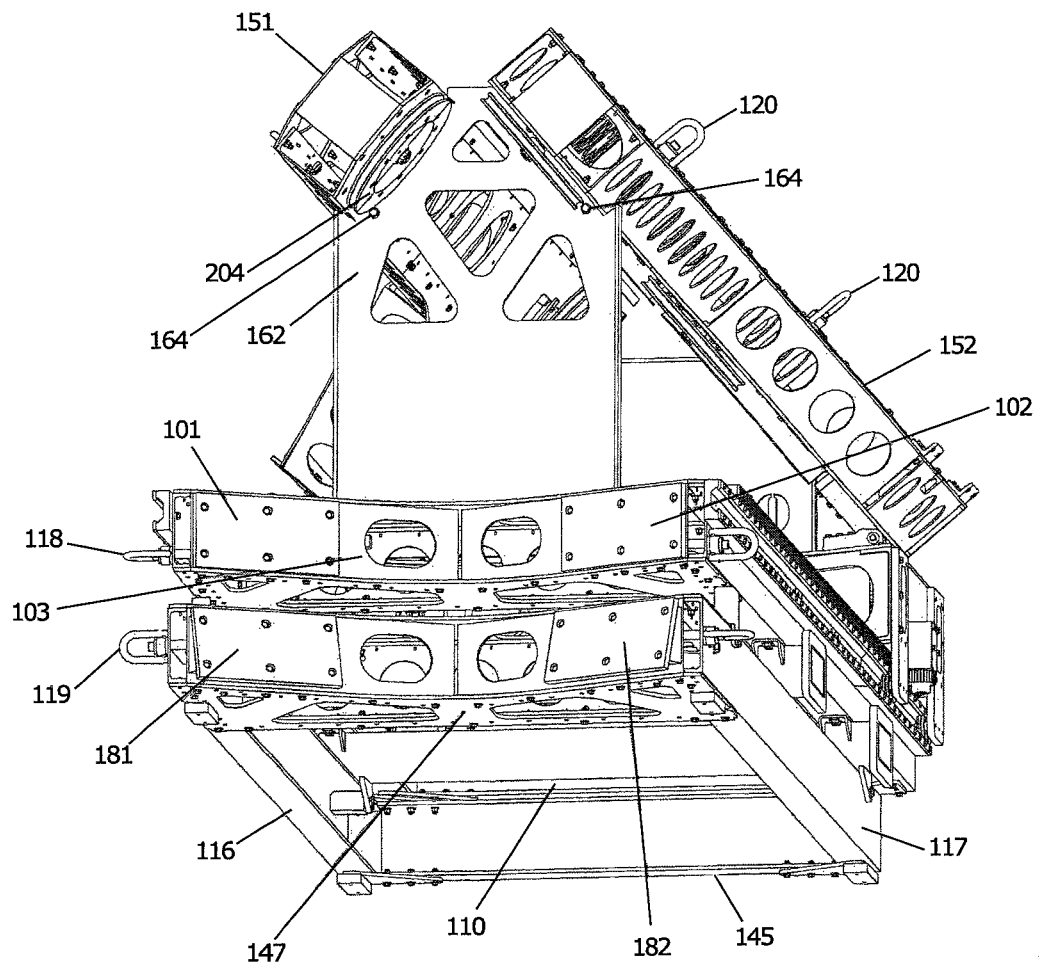
FIG. 6 illustrates a perspective front view of a cutting apparatus in a folded and retracted position in an embodiment of the present invention.

In an embodiment, the frame 100 may have one or more plates connected thereto. For example, as shown in FIGS. 1, 3 and 6, a first side plate 101 and/or a second side plate 102 may be connected to an end portion 103 of the frame 100. The end portion 103 may extend from the second end 122 of the first rail 111 to the second end 132 of the second rail 112 of the frame 100. The end portion 103 may be substantially perpendicular to the first rail 111 and/or the second rail 112. The end portion 103 may have an angled surface arranged so that the first side plate 101 and/or the second side plate 102 may face inwardly toward each other. As shown in FIG. 9, the first side plate 101 and/or the second side plate 102 may contact a pipe 300 to align the pipe 300 with the cutting apparatus 10 for cutting the pipe 300 with the wire 50.

In an embodiment, one or more of the first side plate 101 and/or the second side plate 102 may provide a substantially flat surface which may face away from the frame 100. The first side plate 101 and/or the second side plate 102 may be any shape. In an embodiment, the first side plate 101 and/or the second side plate 102 may be substantially rectangular. As described and shown, the first side plate 101 and/or the second side plate 102 may be angled relative to each other to align the pipe 300 with the cutting apparatus 10.

As shown in FIG. 9, the pipe 300 may be a multi-casing pipe 300 having aggregates filling the casings and/or the pipe 300. The present invention is not limited to cutting a pipe, and any object may be cut using the cutting apparatus 10. During a cutting operation, the pipe 300 may be oriented relative to the cutting apparatus 10 as described in more detail hereafter.

In an embodiment, the cutting apparatus 10 may be folded to reduce the overall size of the cutting apparatus 10. Folding the cutting apparatus 10 has several advantages. One advantage of folding the cutting apparatus 10 may be to reduce the size of the apparatus 10 for more convenient transportation, packaging, crating and/or shipping. Another advantage of folding the cutting apparatus 10 may be to reduce the size of the apparatus for storage and/or when the cutting apparatus 10 is not in use. In an embodiment, the overall width of the cutting apparatus 10 may be reduced in half. Further, in an embodiment, the collapsible lower kicker frame 115 may collapse to minimize the height of the cutting apparatus 10 for more convenient storage, transportation, packaging, crating and/or shipping. Folding the lower kicker frame 115 may reduce the overall height of the cutting apparatus 10. By reducing the overall width and height of the cutting apparatus 10, standard shipping containers and methods may be used and size restrictions for transport may be met which permits the cutting apparatus 10 to be shipped to and used in a greater number of work sites and applications.

As disclosed and shown in the figures, several components of the cutting apparatus 10 may be folded and/or rotated in a manner to reduce the overall dimensions of the cutting apparatus 10 to thereby achieve the benefits and advantages of the invention described herein. For example, the first arm 151 and the second arm 152 may be folded and/or rotated to reduce the overall size of the cutting apparatus 10. The first arm 151 and the second arm 152 are shown in an extended position in FIGS. 1-4, 8-10, 11A, 11B, 12A, 12B, 13A, 13B, 14A and 14B and in a retracted, or folded, position in FIGS. 5-7.

In an embodiment, the cutting apparatus 10 may be folded as follows. First, the diamond wire 50 may be removed. Tension on the wire 50 may be reduced by adjusting the first pulley 201 and/or the second pulley 202 located at the first end 210 of the carriage 200. The first pulley 201 on the first arm 151 and/or the second pulley 202 on the second arm 152 may act as tensioners for the wire 50. Adjusting the first pulley 201 and/or the second pulley 202 may loosen the wire 50 to enable removal of the wire 50 from the cutting apparatus 10. For example, referring the FIG. 3, adjusting the first pulley 201 and/or the second pulley 202 in a direction away from the first end 210 of the carriage 200 and toward the second end 220 of the carriage 200 may provide some slack in the wire 50. The first pulley 201 and/or the second pulley 202 may be adjusted by moving the first pulley 201 and/or the second pulley 202 forward and/or backward in a slot 221 in the first arm 151 and/or the second arm 152, respectively. To provide more tension on the wire 50, the first pulley 201 and/or the second pulley 202 may be adjusted by moving the first pulley 201 and/or the second pulley 202 backward in each respective slot 221 toward the first end 210 of the carriage 200. The adjustment of the first pulley 201 and/or the second pulley 202 in the respective slot 221 may be in a forward direction F or a backward direction B as indicated by arrows shown in FIG. 3. Thus, adjustment in the forward direction F may introduce some slack in the wire 50 which may reduce the tension in the wire 50, and adjustment in the backward direction B may increase the tension in the wire 50.

Next, after the wire 50 may be at least partially removed, the first arm 151 and the second arm 152 may be unlocked from the extended position. The first arm 151 and the second arm 152 may be unlocked by removing fasteners 157 under the first arm 151 and the second arm 152. In an embodiment illustrated in FIG. 2, four fasteners 157 are used to secure each of the first arm 151 and the second arm 152 in the extended position. The fasteners 157 may be cap screws, bolts or other fasteners sufficient to secure the first arm 151 and the second arm 152 in the extended position.

Third, a first support plate 160 may be attached to the carriage 200. The first support plate 160 may be connected by fasteners 161 to the center portion 150 at the first end 210 of the carriage 200. The fasteners 161 may be cap screws, bolts or other fasteners sufficient to secure the first support plate 160 to the center portion 150.

Fourth, a second support plate 162 may be attached to the end portion 103 of the frame 100. The second support plate 162 may be connected to the center portion 150 at the first end 210 of the carriage 200 by fasteners 163. The fasteners 163 may be cap screws, bolts or other fasteners sufficient to secure the second support plate 162 to the end portion 103 of the frame 100.

Fifth, the first arm 151 may be rotated toward the center portion 150 of the carriage 200 by using the first hinge 153 and/or the second hinge 154 as a pivot. Similarly, the second arm 152 may be rotated toward the center portion 150 of the carriage 200 by using the third hinge 155 and/or the fourth hinge 156 as a pivot. Since the first arm 151 and the second arm 152 may be relatively heavy, auxiliary equipment may be used in the folding process. For example, the third rings 120 may be used to aid in the folding process of the first arm 151 and the second arm 152. A lifting device (not shown) may have hooks which may insert into the third rings 120 to lift the first arm 151 and/or the second arm 152 to aid in the folding process. The lifting device may raise the first arm 151 and/or the second arm 152 to thereby rotate the first arm 151 about an axis formed by the first hinge 153 and/or the second hinge 154. Similarly, the lifting device may raise the second arm 152 to thereby rotate the second arm 152 about an axis formed by the third hinge 155 and/or the fourth hinge 156. The lifting device may lift the first arm 151 and/or the second arm 152 until each respective arm rests upon the first support plate 160 and/or the second support plate 162. The first arm 151 and/or the second arm 152 may be secured to the first support plate 160 and/or the second support plate 162 by fasteners 164. The fasteners 164 may be cap screws, bolts or other fasteners sufficient to secure the first arm 151 and/or the second arm 152 to the first support plate 160 and/or the second support plate 162.

Thus, the folding process in an embodiment may include the steps of:

(1) removing the diamond wire 50 by adjusting the tensioning pulleys. The first pulley 201 and/or the second pulley 202 may be adjusted as shown in FIG. 3 by moving the first pulley 201 and/or the second pulley 202 forward in direction F in the slot 221 at the first end 210 of the carriage 200;

(2) unlocking the first arm 151 and the second arm 152 by removing the respective four fasteners 157 located under each of the first arm 151 and the second arm 152;

(3) attaching the first support plate 160 to the center portion 150 of the carriage 200 and the second support plate 162 to the end portion 103 of the frame 100;

(4) folding the first arm 151 and the second arm 152 up so that each respective arm may rest on the first support plate 160 and/or the second support plate 162; and (5) securing the first arm 151 and the second arm 152 to each of the first support plate 160 and/or the second support plate 162.

Figure 7:
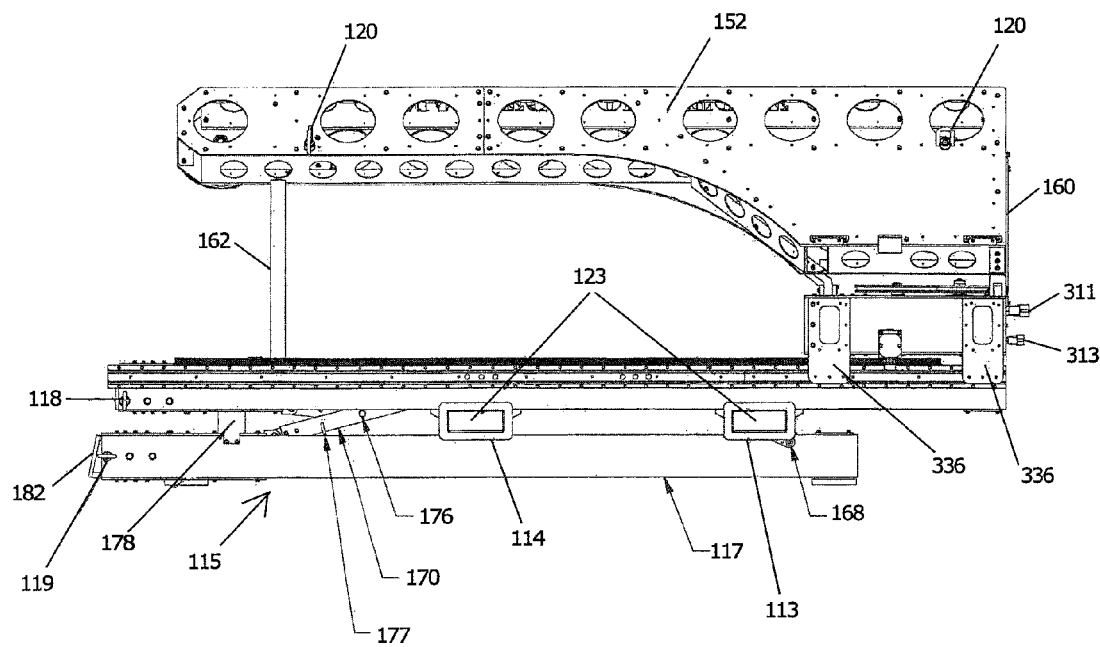
FIG. 7 illustrates a side view of a cutting apparatus in a folded and retracted position in an embodiment of the present invention.
Figure 8:
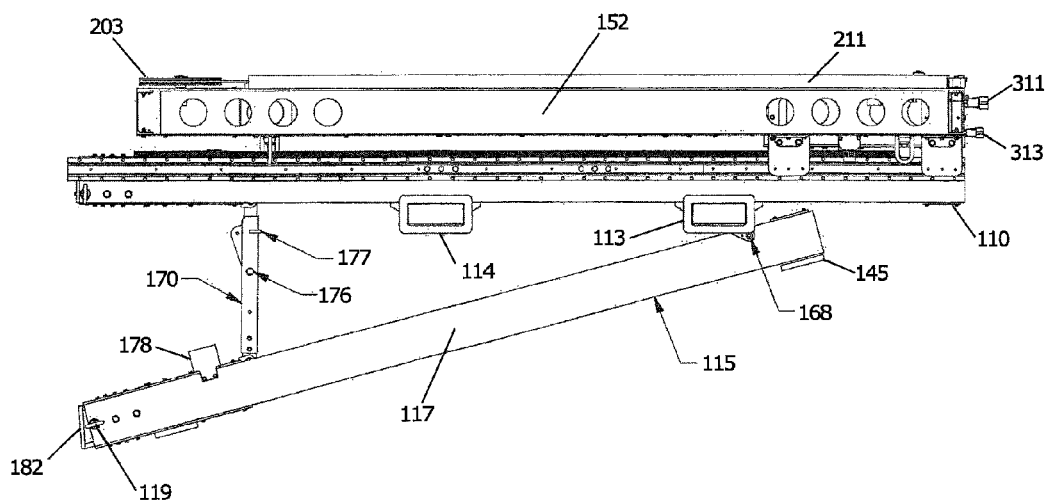
FIG. 8 illustrates a side view of a cutting apparatus in an extended position in an embodiment of the present invention.

In addition to the folding capability for the first arm 151 and the second arm 152, in an embodiment, the kicker frame 115 located below the frame 100 may also collapse and/or retract up against the frame 100 to minimize the size of the cutting apparatus 10 for transport and/or storage. Folding the lower kicker frame 115 may reduce the overall height of the cutting apparatus 10. For example, FIG. 7 illustrates the kicker frame 115 in a retracted position with respect to the frame 100. FIG. 8 illustrates the kicker frame 115 in an extended position with respect to the frame 100.

In the embodiment shown, the kicker frame 115 may be pivotally connected to the frame 100. As shown and described, the kicker frame 115 may have the first end 146 and the second end 148. The kicker frame 115 may also have holes 165 extending through the first rail 116 and the second rail 117. The holes 165 may be located near the first end 146 of the kicker frame 115. The first bar 113 on the frame 100 may have attachment flanges 166 located at each end of the first bar 113. The attachment flanges 166 may also have holes 167 extending therethrough. Connecting pins 168 may connect the kicker frame 115 to the frame 100. The connecting pins 168 may form a pivot between the kicker frame 115 and the frame 100. For example, the connecting pin 168 may pass through each respective hole 167 in the attachment flange 166 at one end of the first bar 113 on the frame 100 and also through the hole 165 in the first rail 116 of the kicker frame 115 to connect the first rail 116 of the kicker frame 115 to the frame 100. The connecting pin 168 may pass through each respective hole 167 in the attachment flange 166 at the other end of the first bar 113 on the frame 100 and also through the hole 165 in the second rail 117 of the kicker frame 115 to connect the second rail 117 of the kicker frame 115 to the frame 100. The connecting pin 168 may be a screw, bolt, pin or the like. The connecting pin 168 may act as a pivot so that the kicker frame 115 may rotate toward and/or away from the frame 100.

As shown in FIGS. 7 and 8, the kicker frame 115 may have folding legs 170 to enable the folding process of the kicker frame 115 relative to the frame 100. The folding legs 170 may have a first end 171 and a second end 172. The first end 171 of the folding legs 170 may be connected to the kicker frame 115 and the second end of the folding legs 170 may be connected to the frame 100. For example, the first end 171 of the folding legs 170 may be connected to the second end portion 147 of the kicker frame 115, and the second end 172 of the folding legs 170 may be connected to the end portion 103 of the frame 100. Each of the first end 171 and the second end 172 of the folding legs 170 may be connected by a fastener 175. The fastener 175 may be a screw, bolt, pin or the like. Each of the folding legs 170 may have a knee 176 located between the first end 171 and the second end 172 of each of the folding legs 170. The folding legs 170 may bend at the knee 176 when the folding legs 170 are folded to the retracted position relative to the frame 100 as shown in FIG. 7. The folding legs 170 may be locked in the retracted position by a locking pin 177. FIG. 8 shows the folding legs 170 locked in the extended position relative to the frame 100 by the locking pin 177.

The kicker frame 115 may also have standoff tabs 178 that may be located on the first rail 116 and the second rail 117 near the second end 148 of the kicker frame 115. The standoff tab 178 on the first rail 116 of the kicker frame 115 may abut the first rail 111 of the frame 100, and the standoff tab 178 on the second rail 117 of the kicker frame 115 may abut the second rail 112 of the frame 100 when the kicker frame 115 is folded toward the frame 100. The first rail 116 and the second rail 117 of the kicker frame 115 may also abut the first bar 113 and/or the second bar 114 of the frame 100 when the kicker frame 115 is folded toward the frame 100. When the kicker frame 115 is folded toward the frame 100 in the retracted position, the first rail 116 and the second rail 117 of the kicker frame 115 may be substantially parallel with the first rail 111 and the second rail 112 of the frame 100. The standoff tabs 178 may aid in maintaining the alignment of the kicker frame 115 with the frame 100 when the kicker frame 115 is folded in the retracted position.

Pivoting the kicker frame 115 away from the frame 100 may increase an angle formed between the kicker frame 115 and the frame 100. The kicker frame 115 may pivot about the connecting pins 168 near the first end 146 of the kicker frame 115. Therefore, pivoting the kicker frame 115 relative to the frame 100 may increase the angle. Also, the second end 148 of the kicker frame 115 and the end portion 103 of the frame 100 may be separated by a distance when the kicker frame 115 is rotated from a folded or retracted position to an extended position relative to the frame 100.

In an embodiment, the kicker frame 115 may be extended when a pipe is cut. FIG. 9 illustrates the kicker frame 115 in the extended position with the cutting apparatus 10 in position to cut a pipe 300. The kicker frame 115 may be removed when space may be limited. However, additional support may be required to anchor the cutting apparatus 10 to the pipe 300 or work piece.

The kicker frame 115 may also have one or more plates connected thereto similar to the first side plate 101 and/or the second side plate 102 connected to the frame 100. For example, as shown in FIGS. 1, 2, and 6-9, a third side plate 181 and/or a fourth side plate 182 may be connected to the second end portion 147 of the kicker frame 115. The second end portion 147 may extend from the second end 132 of the first rail 116 to the second end 142 of the second rail 117 of the kicker frame 115. The second end portion 147 may be substantially perpendicular to the first rail 116 and/or the second rail 117. As shown in FIG. 9, the third side plate 181 and/or the fourth side plate 182 of the kicker frame 115 and/or the first side plate 101 and/or the second side plate 102 of the frame 100 may contact the pipe 300 to align the pipe 300 with the cutting apparatus 10 for cutting the pipe 300 with the wire 50.

In an embodiment, the wire 50 may cut the pipe 300 with a substantially linear cut such that the cut may form one plane. The wire 50 may travel in a direction indicated by arrow W as shown in FIG. 3. The first pulley 201, the second pulley 202, the third pulley 203, the fourth pulley 204, the fifth pulley 205, the sixth pulley 206 and/or the seventh pulley 207 may rotate the wire 50 relative to the plane of the cut. Rotation of the wire 50 relative to the plane of the cut may increase use of the surface area of the wire 50. Increased use of the surface area of the wire 50 may decrease wear of the wire 50. The present invention is not limited to cutting a pipe; any object may be cut using the cutting apparatus 10.

In an embodiment, one or more of the third side plate 181 and/or the second side plate 182 may provide a substantially flat surface which may face away from the kicker frame 115. The third side plate 181 and/or the second side plate 182 may be any shape. In an embodiment, the third side plate 181 and/or the second side plate 182 may be substantially rectangular. The third side plate 181 and/or the second side plate 182 may be angled relative to each other to align the pipe 300 with the cutting apparatus 10. As shown in FIGS. 1, 2, and 6-8, the third side plate 181 and/or the second side plate 182 may also be vertically angled so that each may be parallel to the pipe 300 when the kicker plate 115 may be extended at an angle relative to the frame 100 as shown in FIG. 9.

In an embodiment, hydraulics may be used for certain operations. For example, hydraulics may be used to operate the drive motor 208 for driving at least one of the pulleys to circulate and/or rotate the wire 50 in a cutting operation. Further, hydraulics may be used to operate a feed motor for translating the carriage 200 relative to the frame 100 into the pipe 300 and/or a structure in a cutting operation. Also, hydraulics may be used to aid in lifting the first arm 151 and/or the second arm 152. Further, hydraulics may be used to aid in extending and/or retracting the kicker frame 115.

FIG. 10 is a detail view generally illustrating hydraulic fittings in an embodiment of the invention. Specifically, a first fitting 311 is shown. The first fitting 311 may be a brass hydraulic thread-to-connect coupler with an iron wing nut coupling as shown. A second fitting 312 is also shown. The second fitting 312 may be a brass hydraulic thread-to-connect coupler plug. One having ordinary skill in the art may recognize that other types of fittings may be used. The first fitting 311 and the second fitting 312 may be part of the first hydraulic circuit 315. The first hydraulic circuit 315 may be used to operate the drive motor 208 for driving at least one of the pulleys to circulate and/or rotate the wire 50 in a cutting operation. FIG. 15 illustrates a schematic diagram of the first hydraulic circuit 315.

Figure 11B:
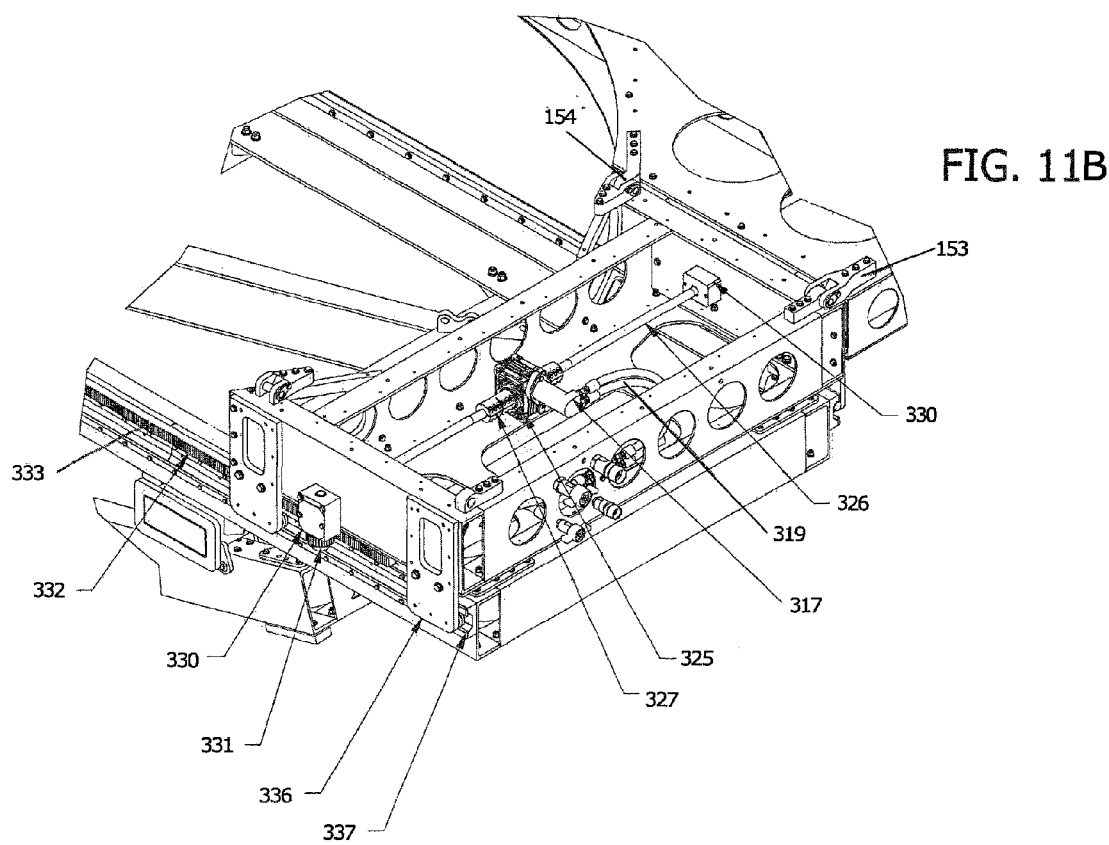
FIG. 11B illustrates a detail view delineated by circle "A" of FIG. 11 of a cutting apparatus in an embodiment of the present invention.
Figure 12A:
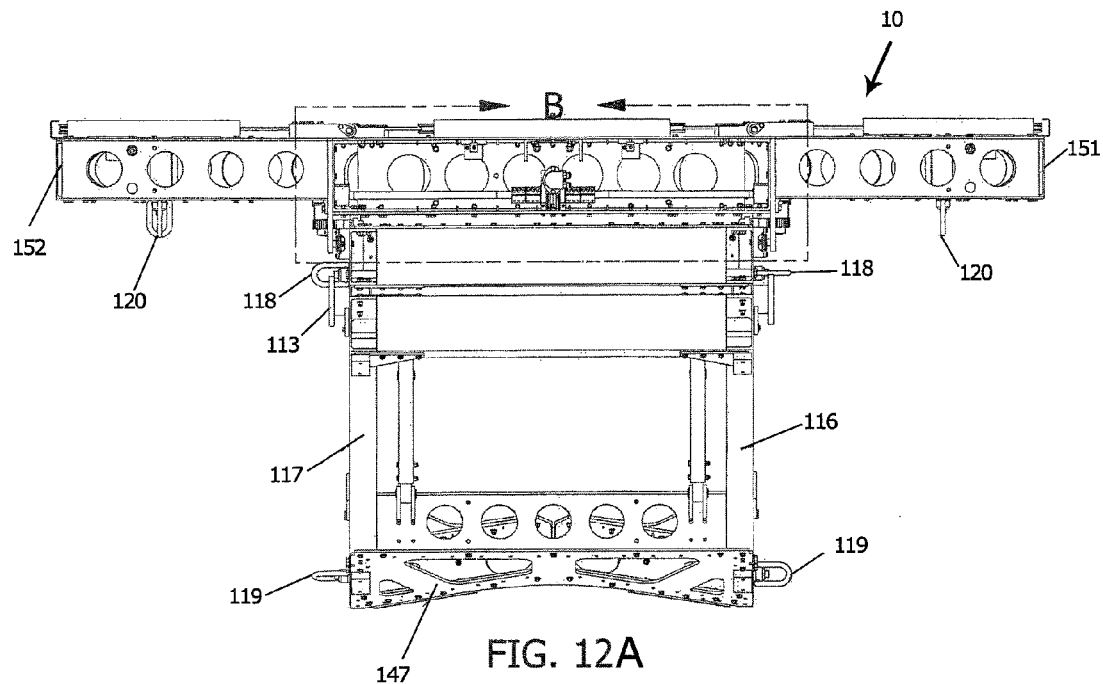
FIG. 12A illustrates a rear view of a cutting apparatus in an extended position in an embodiment of the present invention.
Figure 12B:
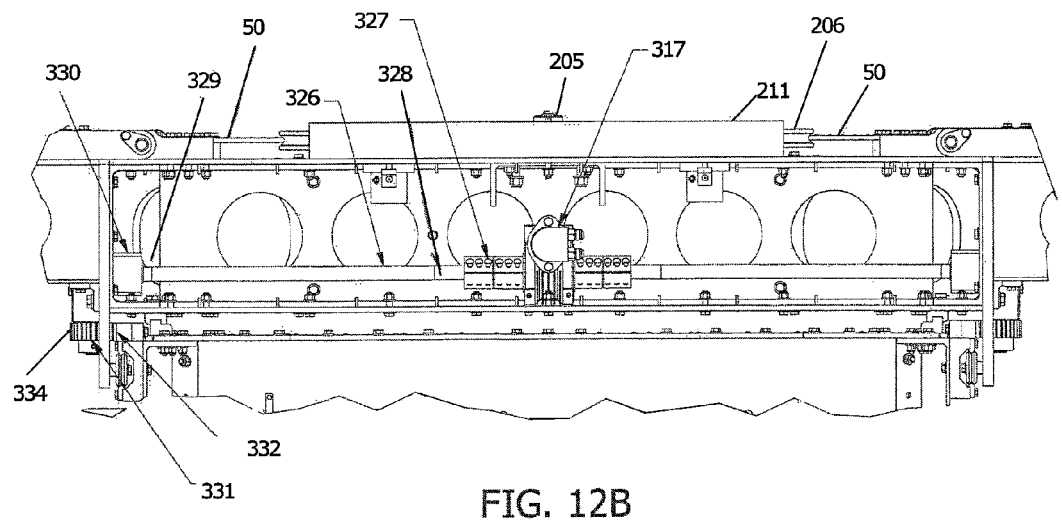
FIG. 12B illustrates a detail view delineated by region "B" of FIG. 12 of a cutting apparatus in an embodiment of the present invention.
Figure 16:
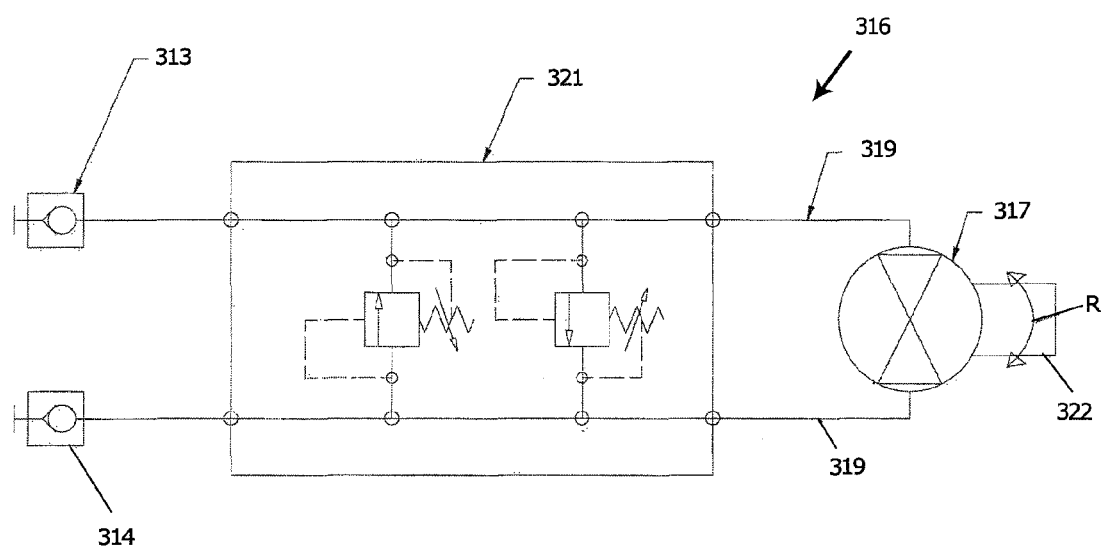
FIG. 16 illustrates a schematic diagram of a second hydraulic circuit for moving a carriage relative to a frame of a cutting apparatus in an embodiment of the present invention.

Similarly, FIG. 10 shows a third fitting 313 and a fourth fitting 314. The third fitting 313 may be the same type as the first fitting 311, and the fourth fitting 314 may be the same type as the second fitting 312. The third fitting 313 and the fourth fitting 314 may be part of a second hydraulic circuit 316. The second hydraulic circuit 316 may be used to operate a feed motor 317 for translating the carriage 200 relative to the frame 100 into the pipe 300 and/or a structure in a cutting operation. FIG. 16 illustrates a schematic diagram of the second hydraulic circuit 316. The operation of the feed motor 317 shown in FIGS. 11B and 12B is described hereafter in greater detail. Hydraulic hoses 318 may be connected to the first fitting 311 and/or the second fitting 312 for carrying hydraulic fluid through the first hydraulic circuit 315. Similarly, hydraulic hoses 319 may be connected to the third fitting 313 and/or the fourth fitting 314 for carrying hydraulic fluid through the second hydraulic circuit 316.

Referring now to FIG. 15, the first hydraulic circuit 315 is shown. The hydraulic line 318 may be connected between the first fitting 311 and the drive motor 208. Another hydraulic line 318 may be connected between the drive motor 208 and the second fitting 312. The first hydraulic circuit 315 may be used to operate the drive motor 208 for driving at least one of the pulleys to circulate and/or rotate the wire 50 in a cutting operation. The first hydraulic circuit 315 may use hydraulic pressure to operate the hydraulic drive motor 208 to drive the motorized drive pulley 205. As shown in FIG. 14A, and in greater detail in FIG. 14B, the hydraulic drive motor 208 may be connected to the motorized drive pulley 205. The drive motor 208 may have a shaft 320 connected to the drive pulley 205 to impart rotation to the drive pulley 205 as shown by an arrow R in FIG. 15. The motorized pulley 205 may rotate to direct the wire 50 through the first pulley 201, the second pulley 202, the third pulley 203, the fourth pulley 204, the fifth pulley 205, the sixth pulley 206 and/or the seventh pulley 207. The pulley motor 208 may control a rotation rate of the motorized pulley 205. The pulley motor 208 may control a wire speed at which the wire 50 travels through the first pulley 201, the second pulley 202, the third pulley 203, the fourth pulley 204, the fifth pulley 205, the sixth pulley 206 and/or the seventh pulley 207 by adjusting the rotation rate of the motorized pulley.

Referring now to FIG. 16, the second hydraulic circuit 316 is shown. The second hydraulic circuit 316 may be used to operate the feed motor 317 for translating the carriage 200 relative to the frame 100 into the pipe 300 and/or a structure in a cutting operation. The hydraulic line 319 may be connected between the third fitting 313 and the feed motor 317. Another hydraulic line 319 may be connected between the feed motor 317 and the fourth fitting 314. The second hydraulic circuit 316 may also have dual crossover relief valves 321. The crossover relief valves 321 may provide pressure surge protection for double acting hydraulic actuators not shown). The feed motor 317 may have a shaft 322 to impart rotation as shown by an arrow R in FIG. 16.

Translational movement of the carriage 200 relative to the frame 100 may be described with reference to FIGS. 11A, 11B, 12A, 12B, 13A and 13B. As generally illustrated in the figures, the carriage 200 may be in a retracted position relative to the frame 100. In the retracted position, the center portion 150 of the carriage 200 located at the first end 210 of the carriage 200 may be adjacent to the first end 121 of the first rail 111 of the frame 100 and/or the first end 131 of the second rail 112 of the frame 100. In the retracted position, the second end 220 of the carriage 200 may be near to the second end 122 of the first rail 111 of the frame 100 and/or the second end 132 of the second rail 112 of the frame 100.

As generally illustrated in FIGS. 11A, 11B, 12A, 12B, 13A and 13B, operation of the feed motor 317 in conjunction with movement of other components may move the carriage 200 from the retracted position to an extended position relative to the frame 100. In the extended position, the first end 210 of the carriage 200 may be located between the first end 121 of the first rail 111 of the frame 100 and the second end 122 of the first rail 111 of the frame 100. In the extended position, the first end 210 of the carriage 200 may be located between the first end 131 of the second rail 112 of the frame 100 and the second end 132 of the second rail 112 of the frame 100. Movement of the carriage 200 from the retracted position to the extended position may move the second end 220 of the carriage 200 away from the second end 122 of the first rail 111 of the frame 100 and/or the second end 132 of the second rail 112 of the frame 100.

Movement of the carriage 200 from the retracted position to the extended position may occur as follows and may involve the following components. The feed motor 317 may be connected to a speed reduction gearbox 325. As shown, the components for translational movement of the carriage 200 may be symmetrical about a center longitudinal axis of the cutting apparatus 10. Thus, the speed reduction gearbox 325 connects to a shaft 326 though a shaft coupling 327 on each side of the feed motor 317. The shaft 326 may have a first end 328 connected to the shaft coupling 327 and a second end 329 connected to a right angle gearbox 330. The right angle gearbox 330 may have a spur gear 331 in contact with a rack 332. The rack 332 may have teeth 333. The spur gear 331 may also have gear teeth 334 that may engage the teeth 333 on the rack 332.

In an embodiment, the carriage 200 may be moved from the retracted position to the extended position by operating the feed motor 317 using the second hydraulic circuit 316. Hydraulic fluid may drive the shaft 322 of the feed motor 317. The rotational movement of the feed motor may be reduced by the speed reduction gearbox 325 and may be transferred through the shaft coupling 327 to rotate the shaft 326. The rotation of the second end 329 of the shaft 326 may be translated 90 degrees by the right angle gearbox 330. The right angle gearbox 330 may drive the spur gear 331. The rotation of the spur gear 331 may be translated into linear movement of the carriage 200 when the gear teeth 334 on the spur gear 331 engage the teeth 333 on the rack 332.

Figure 11A:
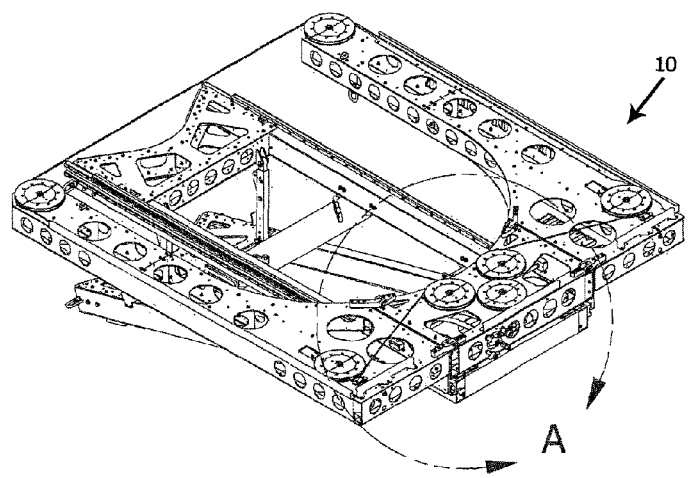
FIG. 11A illustrates a perspective rear view of a cutting apparatus in an extended position in an embodiment of the present invention.
Figure 13A:
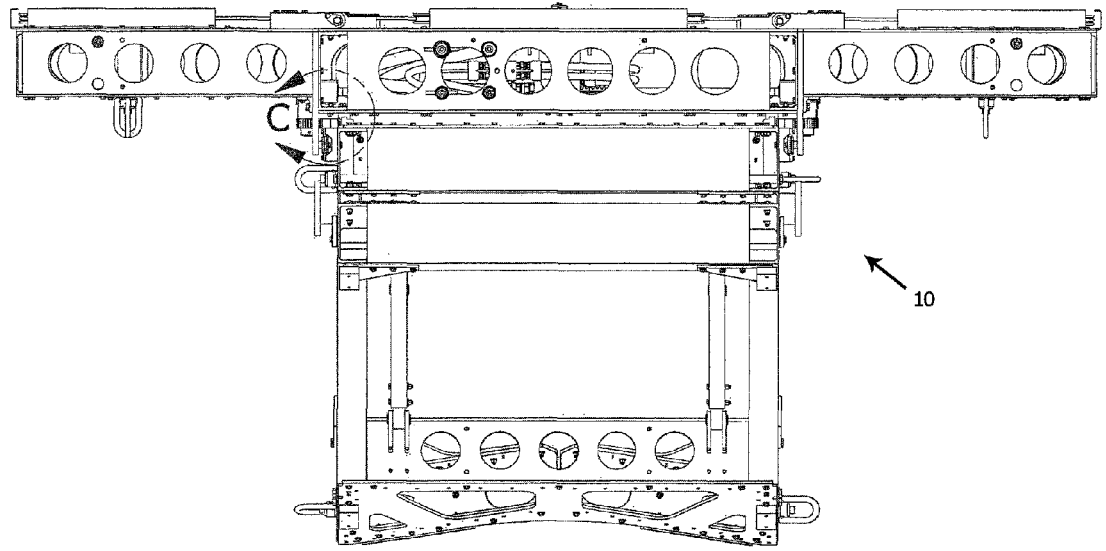
FIG. 13A illustrates a rear view of a cutting apparatus in an extended position in an embodiment of the present invention.
Figure 13B:
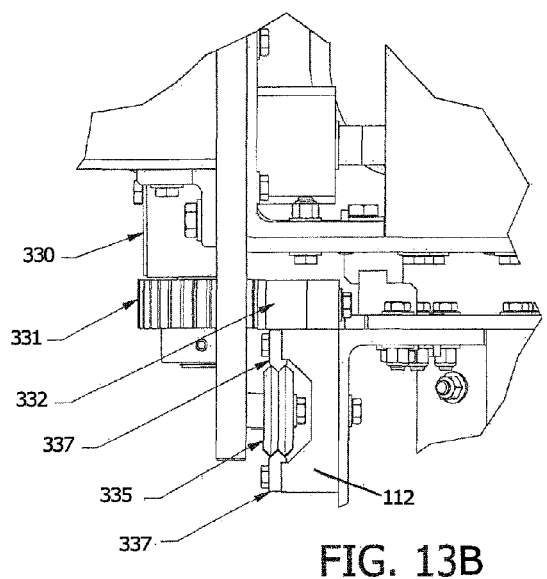
FIG. 13B illustrates a detail view delineated by circle "C" of FIG. 13 of a cutting apparatus in an embodiment of the present invention.

As shown in FIG. 11A, the carriage 200 may have dual v-rollers 335 connected to a roller plate 336 on either side of the center portion 150. As shown in FIG. 13B, the second rail 112 of the frame 100 may have v-rails 337 located above and/or below the dual v-rollers 335. Similarly, the first rail 111 of the frame 100 may have v-rails 337 located above and/or below dual v-rollers 335. Thus, rotation of the spur gear 331 may be translated into linear movement of the carriage 200 when the gear teeth 334 on the spur gear 331 engage the teeth 333 on the rack 332. The v-rollers 335 on the carriage 200 may travel on the v-rails 337 on the frame 100 so that the carriage 200 may be linearly moved from the retracted position to the extended position by means of the rotational engagement of the gear teeth 334 on the spur gear 331 with the teeth 333 on the rack 332. The alignment of the v-rollers 335 on the carriage 200 with the v-rails 337 on the frame 100 may cause straight linear movement of the carriage 200 from the retracted position to the extended position. FIG. 9 illustrates the carriage 200 in the extended position with respect to the frame 100 so that the wire 50 may travel into and through the pipe 300 during a cutting operation.

Movement of the carriage 200 from the retracted position to the extended position may move the wire 50 through the pipe 300. Movement of the wire 50 through the first pulley 201, the second pulley 202, the third pulley 203, the fourth pulley 204, the fifth pulley 205, the sixth pulley 206 and/or the seventh pulley 207 during movement of the wire 50 through the pipe 300 may cut the pipe 300. For example, the first pulley 201, the second pulley 202, the third pulley 203, the fourth pulley 204, the fifth pulley 205, the sixth pulley 206 and/or the seventh pulley 207 may rotate relative to the carriage 200 as the pipe 300 is cut and/or may transfer torque to the wire 50 as the pipe 300 is cut.

The carriage 200 may also move from the extended position to the retracted position. For example, the carriage 200 may move from the extended position to the retracted position after cutting the pipe 300. As a further example, the carriage 200 may move from the extended position to the retracted position to replace the wire 50 without removing the cutting apparatus 10 from the pipe 300.

Movement of the carriage 200 from the extended position to the retracted position relative to the frame 100 may enable the cutting apparatus 10 to be stored and/or to be transported to another location to cut another object. As discussed previously, the movement of the carriage 200 from the extended position to the retracted position relative to the frame 100 may enable replacement of the wire 50 without removing the cutting apparatus 10 from the pipe 300. For example, the movement of the carriage 200 from the extended position to the retracted position relative to the frame 100 may enable replacement of the wire 50 from a rear of the cutting apparatus 10 such that a position of the pipe 300 relative to the cutting apparatus 10 may be maintained.

In another embodiment, the present invention may use a clamp system as disclosed in Shae et al. in U.S. Patent Application Publication No. 2011/0214543 A1, assigned to the assignee of the present application, and incorporated herein by reference in its entirety. As generally illustrated in FIGS. 20, 21, 22A and 22B of Shae et al., the cutting apparatus 10 may have a clamp system 500 for aligning the pipe 300 and/or maintaining a position of the pipe 300 relative to the cutting apparatus 10. Further, the present invention is not limited to a specific means of aligning the pipe 300 and/or maintaining the position of the pipe 300 relative to the cutting apparatus 10. For example, the cutting apparatus 10 may use magnets, a tensioned chain, a tensioned cable and/or the like to align the pipe 300 and/or maintain the position of the pipe 300 relative to the cutting apparatus 10.

Moreover, operation of the cutting apparatus 10 and/or the clamp system 500 may be controlled remotely, such as, for example, as disclosed in Shae et al. Operation of the cutting apparatus 10 and/or the clamp system 500 may be controlled remotely, such as, for example, by a ROV interface as known to one having ordinary skill in the art. For example, the cutting apparatus 10 may be located underwater to cut a pipe 300 located underwater, and the cutting apparatus 10 may be controlled from a vessel located at the water surface.

The cutting apparatus 10 and/or the clamp system 500 may be controlled by instructions from a remote location relative to the cutting apparatus 10 using the ROV interface. For example, a terminal (not shown) may be located remote relative to the cutting apparatus 10, and/or the terminal may provide the ROV interface to a user of the terminal. The terminal may transmit instructions from the user to the cutting apparatus 10. The terminal may be, for example, a desktop PC, a personal digital assistant MIA), a mobile telephone, a laptop PC and/or any electronic device which may be capable of receiving and transmitting the instructions to the cutting apparatus 10. The present invention is not limited to a specific embodiment of the terminal or the instructions.

The instructions may direct operation of the cutting apparatus 10. Thus, the instructions may move the carriage 200 from the extended position to the retracted position relative to the frame 100. Further, the instructions may control a feed rate. The feed rate may be a speed of movement of the carriage 200 relative to the frame 100. Thus, the instructions may increase and/or may decrease the feed rate.

In an embodiment, a circuit (not shown) may automatically control the feed rate. Adjustment of the feed rate may maintain a tension in the wire 50 to be equal to a predetermined tension. For example, as the carriage 200 moves, the tension in the wire 50 may act against a spring (not shown) which may be attached to a hydraulic control valve. As the wire 50 advances into the pipe 300, the tension in the wire 50 may increase so that the spring may be deflected. As the spring deflects the hydraulic control valve, flow of hydraulic oil may be reduced. Reduced flow of hydraulic oil may decrease the feed rate. Therefore, the circuit may compensate for a size of the pipe 300, an amount and/or a type of material located in the pipe 300, and/or other conditions. Accordingly, the feed rate may be maintained at the predetermined feed rate and/or the tension in the wire 50 may stay constant during cutting of the pipe 300.

As discussed, the pulley motor 208 may adjust the speed of the motorized pulley to control the feed rate at which the wire 50 may travel through the first pulley 201, the second pulley 202, the third pulley 203, the fourth pulley 204, the fifth pulley 205, the sixth pulley 206 and/or the seventh pulley 207. The ROV interface may be used by the user and/or the terminal to adjust the speed of the motorized pulley. Adjustment of the speed of the motorized pulley may control the wire speed at which the wire 50 travels through the first pulley 201, the second pulley 202, the third pulley 203, the fourth pulley 204, the fifth pulley 205, the sixth pulley 20E and/or the seventh pulley 207. For example, the instructions transmitted from the terminal to the cutting apparatus 10 may adjust the speed of the motorized pulley.

The cutting apparatus 10 may transmit information to the terminal. For example, tools (not shown) may be attached to the cutting apparatus 10, and/or the tools may obtain the information and/or may transmit the information to the terminal. For example, one or more of the tools may be a video camera that may obtain video data and/or may transmit the video data to the terminal. The terminal may use the ROV interface to display the video data to the user. As a further example, one or more of the tools may be a light to enable the video camera to obtain the video data. As yet another example, one or more of the tools may be a sensor that may obtain a temperature of an environment in which the cutting apparatus 10 is located and/or a pressure of the environment in which the cutting apparatus 10 is located. The sensor may transmit the temperature and/or the pressure to the terminal. The terminal may use the ROV interface to indicate the temperature and/or the pressure to the user. Even further, one or more of the tools may be a positioning tool that may determine a location of the cutting apparatus 10 and/or may transmit the location of the cutting apparatus 10 to the terminal. The terminal may use the ROV interface to indicate the location of the cutting apparatus 10 to the user. The present invention is not limited to a specific embodiment of the information and/or the tools.

Other variations and/or geometric configurations which are known to one having ordinary skill in the art are possible and are deemed to be within the scope of this disclosure. The materials used for the components of the cutting apparatus 10 may be selected from any suitable material to perform the desired function for operation of the cutting apparatus 10. The materials must also be capable of withstanding environmental conditions that may be encountered. Considerations of performance and/or reliability are also important in the selection of the material. Other materials which are known to one having ordinary skill in the art may be selected and are deemed to be within the scope of this disclosure. Further, known bonding techniques that are suitable for the type of material selected are considered to be within the scope of this disclosure.

As disclosed above, the cutting apparatus 10 may also be manufactured in numerous embodiments. The various embodiments of the cutting apparatus 10 may have additional components which may provide enhanced functionality of the cutting apparatus 10.

Moreover, the present invention is not limited to the specific arrangement of the components of the cutting apparatus 10 illustrated in the figures. It should be understood that various changes and modifications to the presently preferred embodiments described herein will be apparent to those having ordinary skill in the art. Such changes and modifications may be made without departing from the spirit and scope of the present invention and without diminishing its attendant advantages. It is, therefore, intended that such changes and modifications be covered by the appended claims.

We claim:

1. An apparatus for cutting an object, the apparatus comprising:
a carriage;
a frame having a first end and a second end located opposite to the first end, wherein the carriage moves on the frame from a first position at the first end of the frame to a second position at the second end of the frame;
a feed motor for moving the carriage relative to the frame;
a kicker frame connected to the frame wherein the kicker frame pivots relative to the frame;
a first arm and a second arm each pivotably connected to the carriage;
a hinge connecting each of the first arm and the second arm to the carriage;
a first pulley connected to the first arm;
a second pulley connected to the second arm;
a wire attached to the first pulley and the second pulley;
a drive motor that moves the wire through at least one of the first pulley and the second pulley, wherein the drive motor and the feed motor are hydraulic;
a first hydraulic circuit that operates the drive motor; and
a second hydraulic circuit that operates the feed motor.

2. The apparatus of claim 1 further comprising:
an end portion connected at the second end of the frame wherein the end portion has an alignment plate.

3. The apparatus of claim 1 further comprising:
a drive pulley connected to the carriage wherein the wire travels through the drive pulley, the first pulley and the second pulley.

4. The apparatus of claim 1 wherein the first pulley is adjustable.

5. The apparatus of claim 1 further comprising:
a safety guard connected along an outer edge of each of the carriage, the first arm and the second arm.

6. The apparatus of claim 1 further comprising:
rings connected to each of the first arm and the second arm.

7. The apparatus of claim 1 further comprising:
a first hollow bar and a second hollow bar of the frame wherein each of the first hollow bar and the second hollow bar has an opening therethrough and further wherein the first bar and the second bar are substantially parallel to each other.

8. The apparatus of claim 1 further comprising:
a support plate connected to an end of the frame.

9. The apparatus of claim 1 further comprising:
a drive train having a gear on the carriage and a rack on the frame wherein the gear engages the rack to move the carriage from the first position to the second position.

10. A system for cutting an object comprising:
a frame;
a kicker frame connected to the frame wherein the kicker frame pivots relative to the frame;
a carriage connected to the frame wherein the carriage moves from a first position relative to the frame to a second position relative to the frame to cut the object;
a drive train connected to the frame and the carriage;
pulleys connected to the carriage;
a drive motor connected to one of the pulleys;
a wire attached to the pulleys wherein the wire travels through the pulleys;
a first hydraulic circuit to operate the motor for rotating the wire; and
a second hydraulic circuit to operate the drive train for translating the carriage relative to the frame.

11. The system of claim 10 further comprising:
a first arm and a second arm each pivotably connected to the carriage.

12. An apparatus for cutting an object, the apparatus comprising:
- a carriage;
- a frame having a first end and a second end located opposite to the first end wherein the carriage moves on the frame from a first position at the first end of the frame to a second position at the second end of the frame;
- a first arm and a second arm each pivotably connected to the carriage;
- a first pulley connected to the first arm;
- a second pulley connected to the second arm;
- a wire attached to the first pulley and the second pulley wherein the wire travels through the first pulley and the second pulley; and
- a kicker frame pivotably connected at the first end of the frame wherein the kicker frame has a folding leg having a first end connected to the kicker frame and a second end connected to the frame wherein the kicker frame pivots away from the second end of the frame when the folding leg is extended.

13. An apparatus for cutting an object, the apparatus comprising:
- a carriage;
- a frame having a first end and a second end located opposite to the first end wherein the carriage moves on the frame from a first position at the first end of the frame to a second position at the second end of the frame;
- a first arm and a second arm each pivotably connected to the carriage;
- a first pulley connected to the first arm;
- a second pulley connected to the second arm;
- a wire attached to the first pulley and the second pulley wherein the wire travels through the first pulley and the second pulley; and
- a kicker frame having a first end and a second end opposite the first end wherein the first end of the kicker frame is pivotably connected at the first end of the frame wherein the kicker frame has a crossbar at the second end of the kicker frame and further wherein the kicker frame has an alignment plate connected to the crossbar.

* * * * *